United States Patent [19]
Katata et al.

[11] Patent Number: 6,148,030
[45] Date of Patent: Nov. 14, 2000

[54] MOTION PICTURE CODING AND DECODING APPARATUS

[75] Inventors: Hiroyuki Katata; Norio Ito; Tomoko Aono; Hiroshi Kusao; Shuichi Watanabe, all of Chiba, Japan

[73] Assignee: Sharp Kabushiki Kaisha, Osaka, Japan

[21] Appl. No.: 09/117,501

[22] PCT Filed: Feb. 5, 1997

[86] PCT No.: PCT/JP97/00276

§ 371 Date: Jul. 30, 1998

§ 102(e) Date: Jul. 30, 1998

[87] PCT Pub. No.: WO97/29595

PCT Pub. Date: Aug. 14, 1997

[30] Foreign Application Priority Data

Feb. 7, 1996 [JP] Japan ................................. 8-020757
May 16, 1996 [JP] Japan ................................. 8-121752
Jun. 21, 1996 [JP] Japan ................................. 8-161626

[51] Int. Cl.$^7$ .................................................... H04B 1/66
[52] U.S. Cl. ................................ 375/240.1; 348/845.2; 375/240.25
[58] Field of Search .......................... 375/240.1, 240.25; 348/390, 413, 416, 699, 845.2

[56] References Cited

U.S. PATENT DOCUMENTS 5,132,792  7/1992  Yonemitsu et al. .................. 348/416
5,608,458  3/1997  Chen et al. ........................... 348/413

FOREIGN PATENT DOCUMENTS 20-708563  4/1996  European Pat. Off. .
3-129985   6/1991  Japan .
8-116542   5/1996  Japan .
8-214318   8/1996  Japan .
97/29595   8/1997  WIPO ...................... H04N 7/32

OTHER PUBLICATIONS

Hanamura, et al, "A Proposal of Hierarchical Video Signal Coding Scheme to MPEGII", vol. 91 No. 477, Feb. 21, 1992, pp. 1–8.

Etoh, et al, "An Image Coding Scheme Using Layered Representation and Multiple Templates", The Institute of Electronics Information and Communication Engineers, pp. 99–106.

Katata, et al, "International Organization for Standardization, ISO/IEC JTC1/SC29/WG11, Coding of Moving Pictures and Associated Audio," Jul. 1995/Tokyo, p. 1–2.

*Primary Examiner*—Howard Britton

[57] ABSTRACT

A motion picture coding and decoding apparatus synthesizes a lower layer frame at a certain time by using first component area information of a lower layer preceding in the time and second component area information of a lower layer succeeding in the time. For an area where the first and second component areas overlapped, or for an area which is neither the first nor the second component area on the lower layer frame, lower layer frames preceding and succeeding in time are subjected to weighted average for synthetisization. For the area corresponding to the first component area only, the lower layer frame succeeding in time is used, and for the area corresponding to the second component area only on the synthesized lower layer frame, the lower layer frame preceding in time is used, for synthesizing the lower layer.

17 Claims, 26 Drawing Sheets

LOWER LAYER 1   UPPER LAYER   LOWER LAYER 3

COMPONENT IMAGE 1

COMPONENT IMAGE 2

COMPONENT IMAGE 3

MOTION PICTURE CODING AND DECODING APPARATUS

This application is the national phase under 35 U.S.C. §371 of prior PCT International Application No. PCT/JP97/00276 which has an International filing date of Feb. 5, 1997 which designated the United States of America, the entire contents of which are hereby incorporated by reference.

TECHNICAL FIELD

The present invention relates to a motion picture coding and decoding apparatus for coding and decoding motion picture or image data represented in digital manner. More specifically, the present invention relates to a motion picture coding and decoding apparatus free of image degradation.

BACKGROUND ART

In image coding, a method of superimposing different motion picture sequences has been studied. In an article entitled "An Image Coding Scheme Using Layered Representation and Multiple Templates" (Technical Report of IEICE, IE94-159, pp. 99–106 (1995)) discloses a method of forming a new sequence by superimposing a motion picture sequence as a background and a motion picture sequence of a component motion picture or image as a foreground (for example, video image of a character or fish cut out by chromakey technique).

An article "Temporal Scalability Based on Image Content", ISO/IEC/JTC1/SC29/WG11 MPEG95/211(1995) discloses a method of forming a new sequence by superimposing a motion picture sequence of component motion images having high frame rate on a motion picture sequence having a low frame rate.

According to this method, referring to FIG. 27, prediction coding is performed at a low frame rate at a lower layer, and prediction coding is performed at a high frame rate only at a selected area (hatched portion) of an upper layer. However, a frame coded in the lower layer is not coded in the upper layer, but decoded image of the lower layer is copied and used as it is. It is assumed that a portion to which a viewer pays attention, such as a figure or a character is selected as the selected area.

FIG. 26 is a block diagram showing a main portion of a conventional motion picture coding and decoding apparatus. Referring to the left side of FIG. 26, in a coding apparatus of the conventional motion picture and encoding apparatus, first and second skipping units 801 and 802 thin out frames of input motion picture data. The input image data thus comes to have lower frame rate and input to upper layer coding unit 803 and lower layer coding unit 804, respectively. It is assumed that the frame rate for the upper layer is not lower than the frame rate of the lower layer.

Input motion picture as a whole is coded in lower layer coding unit 804. Internationally standardized method of motion picture coding such as MPEG or H.261 is used as the coding method. A decoded image of the lower layer is formed in lower layer coding unit 804, which image is utilized for prediction coding and at the same time, input to a superimposing unit 805.

Only the selected area of the input motion picture is coded in upper layer coding unit 803 of FIG. 26. The internationally standardized method of motion picture coding such as MPEG or H.261 is also used here. Only the selected area is coded, however, based on area shape information. A frame which has already been coded in the lower layer is not coded in the upper layer. The area shape information represents shape of the selected area such as a figure portion, and is a binary image assuming the value 1 at the position of the selected area and the value 0 at other positions. Only the selected area of the motion picture is coded in upper layer coding unit 803, and input to superimposing unit 805.

The area shape is coded utilizing 8 directional quantizing code in an area shape coding unit 806. FIG. 25 depicts the 8 directional quantizing code. As can be seen from the figure, the 8 directional quantizing code represents a direction to a next point by a numerical value, which is generally used for representing a digital figure.

At a frame position where a lower layer frame has been coded, superimposing unit 805 outputs a decoded image of the lower layer. At a frame position where the lower layer frame has not been coded, the superimposing unit forms an image by using coded images of preceding and succeeding two coded lower layers of the frame of interest and one upper layer decoded image of the same time point, and outputs the formed image. The image formed here is input to upper layer coding unit 803 and utilized for prediction coding. The method of forming the image in the superimposing unit 805 is as follows.

First, an interpolated image of two lower layers is formed. A decoded image of a lower layer at a time point t is represented as B (x, y, t). Here, x and y are coordinates representing pixel position in a space. When we represent time points of the two lower layers as t1 and t2 and the time point for the upper layer as t3 (where t1<t3<t2), the interpolated image I (x, y, t3) at time point t3 is calculated as follows.

$$I(x, y, t3)=[(t2-t3)B(x, y, t1)+(t3-t1)B(x, y, t2)]/(t2-t1) \quad (1)$$

Thereafter, a decoded image E of the upper layer is superimposed on the interpolated image I calculated as above. For this purpose, weight information W(x, y, t) for superimposing is formed from area shape information M(x, y, t), and a superimposed image S is obtained in accordance with the following equation.

$$S(x, y, t)=[1-W(x, y, t)]I(x, y, t)+E(x, y, t)W(x, y, t) \quad (2)$$

The area shape information M(x, y, t) is a binary image which assumes the value 1 in the selected area and the value 0 outside the selected area. The image passed through a low pass filter for a plurality of times provides weight information W(x, y, t).

More specifically, the weight information W(x, y, t) assumes the value 1 in the selected area, 0 outside the selected area, and a value between 0 and 1 at a boundary of the selected area. The operation of superimposing unit 805 is as described above.

The coded data coded by lower layer coding unit 804, upper layer coding unit 803 and area shape coding unit 806 are integrated by a coded data integrating unit, not shown, and transmitted or stored.

The method of decoding in the conventional apparatus will be described in the following. Referring to the right side of FIG. 26, in the decoding apparatus, coded data are decomposed by a coded data decomposing unit, not shown, into coded data for the lower layer, coded data for the upper layer and the coded data for the area shape. The coded data are decoded by a lower layer decoding unit 808, an upper layer decoding unit 807 and an area shape decoding unit 809, as shown in FIG. 26. A superimposing unit 810 of the decoding apparatus is similar to superimposing unit 805 of the coding apparatus. Using the lower layer decoded image and the upper layer decoded image, images are superimposed by the same method as described with respect to the coding side. The superimposed motion picture is displayed on a display, and input to upper layer decoding unit 807 to be used for prediction of the upper layer.

Though a decoding apparatus for decoding both the lower and upper layers has been described, in a decoding apparatus having only a unit for decoding the lower layer, upper layer decoding unit 807 and superimposing unit 810 are unnecessary. As a result, part of the coded data can be reproduced in a smaller hardware scale.

In the conventional art, as represented by the equation (1), when an output image is to be obtained from two lower layer decoded images and one upper layer decoded image, interpolation between two lower layers is performed. Accordingly, when a position of the selected area changes with time, there would be a considerable distortion around the selected area, much degrading the image quality.

FIGS. 28A to 28C are illustrations of the problem. Referring to FIG. 28A, images A and C represent two decoded images of the lower layer, and image B is a decoded image of the upper layer, and the time of display is in the order of A, B and C. Here, selected areas are hatched. In the upper layer, only the selected area is coded, and hence areas outside the selected area are represented by dotted lines. As the selected area moves, an interpolated image obtained from images A and C has two selected areas superimposed as shown by the screened portion of FIG. 28B.

When image B is superimposed using weight information, the output image has three selected areas superimposed as shown in FIG. 28C. Particularly, around (outside) the selected area of the upper layer, the selected areas of the lower layers appear like after images, which significantly degrade the image quality. When the lower layer only is displayed, there is not the aforementioned distortion in the motion picture as a whole, and when the superimposed image of the upper and lower layers is displayed, there appears the aforementioned distortion, and therefore flicker type distortion is generated in the motion picture, which causes extremely severe degradation of image quality.

International standardization (ISO/IEC MPEG4) of the motion picture coding method proposes coding, decoding and synthesizing of images having a plurality of component parts by a coding apparatus and a decoding apparatus having hierarchical structures such as shown in FIG. 29. Here, a component image refers to an image cut out as a component, such as a character or an object in the motion picture. Common motion picture itself is also treated as one of the component images. Generally, among coded data, identification numbers of respective component images are coded and, on the decoding side, the identification numbers are decoded and based on the decoded identification numbers, coded data corresponding to the desired component images are selected.

FIGS. 30A to 30E schematically depict component images and the manner of synthesizing the images. Component image 1 of FIG. 30A is a common motion picture representing background, and component image 2 of FIG. 30B is a motion picture obtained by cutting out a figure only. Component image 3 of FIG. 30C is a motion picture obtained by cutting out a car only. When only the component image 1 is decoded among the coded data, an image of background only corresponding to FIG. 30A is obtained. When component images 1 and 2 are decoded and synthesized, an image such as shown in FIG. 30D is reproduced. When component image 3 is decoded and these three component images are synthesized, an image such as shown in FIG. 30E is reproduced. Here, such a hierarchical nature is referred to as hierarchy of component images.

The conventional coding and decoding apparatuses having hierarchical structure as described above do not have the function of hierarchically coding and decoding image quality of each component image. Here, the image quality refers to spatial resolution of the component image, number of quantization levels, frame rate and so on.

DISCLOSURE OF THE INVENTION

Therefore, an object of the present invention is to prevent degradation of image quality in a motion picture coding and decoding apparatus.

Another object of the present invention is to perform editing process with a desired image quality as needed, in a motion picture coding and decoding apparatus.

A still further object of the present invention is to perform rough edition with images of low quality, and thereafter perform edition using image data of high quality, in a motion picture coding and decoding apparatus.

A still further object of the present invention is to make it possible, in a motion picture coding and decoding apparatus, that a component image of low quality is reproduced when part of coded data are decoded, and that a component image is reproduced with high quality when all coded data are decoded.

A further object of the present invention is to provide a motion picture coding and decoding apparatus having both component image hierarchy and image quality hierarchy.

In the motion picture coding and decoding apparatus in accordance with the present invention, lower layer coding, in which a motion picture sequence is coded at a first frame rate, and upper layer coding in which the motion picture sequence is coded at a second frame rate higher than the first rate, are performed. In decoding the lower layer, only the lower layer of the first frame rate is decoded, and in decoding the upper layer, the lower layer and the upper layer of the second frame rate are decoded, and the upper and lower layers are superimposed. The picture coding and decoding apparatus includes a synthesizing unit for synthesizing, when there is not a lower layer corresponding to a frame position same as that of an upper layer in decoding, the non-existing lower layer frame by using first and second lower layers preceding and succeeding the frame position. The synthesizing unit includes an encoder for encoding, in an upper layer, a first area shape preceding in time of the lower layer and a second area shape succeeding in time, and a synthesizer for synthesizing using the first and second area shapes.

At the time of synthesizing the lower layer frame which has not been coded, the first area shape of the lower layer preceding in time and the second area shape of the lower layer succeeding in time are decoded in the upper layer, and synthesizing is performed using the first and second area shapes. Therefore, even when the area shape changes with time, there is not a distortion in the superimposed image of the lower and upper layers, and hence an image of good quality can be obtained.

Preferably, when there is not a lower layer frame corresponding to the same frame position as the upper layer at the time of decoding, coding of the first and second area shapes is not performed, and the first and second area shapes are extracted from coded data of one of or both of the lower and upper layers.

In synthesizing the lower layer frame, the first area shape of the lower layer preceding in time and the second area shape of the lower area succeeding in time are not coded, but the first and second area shapes are extracted from the decoded data of one of or both of the lower and upper layers. Accordingly, encoding of the area shape of the upper layer is unnecessary, and hence the number of bits can be reduced.

Preferably, a first flag indicating whether pixel information of an upper layer is to be coded or not at the time of coding the upper layer is provided, and a situation where only the area shape is coded in the upper layer and a situation where both the area shape and pixel information are coded can be identified by the decoding apparatus based on the first flag. As a result, it can be readily known by the decoding apparatus how the coding was performed.

More preferably, when there is not a lower layer frame at a frame position corresponding to that of an upper layer and area shapes of lower layers preceding and succeeding in time are to be extracted, a lower layer decoded image is divided and, utilizing the result of division, the area shapes are extracted.

As a result, the area shapes can be obtained accurately without increasing the number of bits.

More preferably, when there is not a lower layer frame at a frame position corresponding to that of an upper layer and area shapes of lower layers preceding and succeeding in time are to be extracted, the area shapes are presumed and extracted using an area shape obtained at the time of decoding the upper layer.

Therefore, the area shapes can be obtained readily without increasing the number of bits.

More preferably, there is provided a second flag indicating, when there is not a lower layer frame corresponding to the frame position of the upper layer at the time of decoding, whether the lower layer frame is to be synthesized using preceding and succeeding lower layers, and if synthesization of the lower layer frame is not performed, the preceding or the succeeding lower layer frame is used as the synthesized lower layer frame. This enables reduction of processing necessary for synthesizing.

More preferably, a third flag indicating whether a first area shape of a lower layer preceding in time is to be coded or not, and a fourth flag indicating whether a second area shape of a lower layer succeeding in time is to be coded or not, in synthesizing the lower layer frame, are provided. When neither the first area shape nor the second area shape is coded, area shapes used for synthesization last time are used as area shapes for synthesization this time, when the second area shape only is to be coded, the second area shape used for synthesization last time is used as the first area shape for synthesization this time, and there is not a situation where only the first area shape is coded.

Since the area shape is not coded in the lower layer, a large number of bits are never generated in the lower layer. Accordingly, a large distortion is not generated even in a memory transmitting at a relatively low bit rate transmitting or storing the lower layer, and good lower layer image can be transmitted or stored.

According to another aspect of the present invention, in the motion picture coding apparatus for coding the motion picture, the motion picture includes a plurality of component motion pictures or images for constituting the motion picture. The motion picture coding apparatus includes a reference image identification number coding unit for coding an identification number of a reference component image used for prediction coding, a reference image selecting unit for selecting a reference image out of a plurality of component images in accordance with the identification number, and an image quality improving unit for improving image quality of the coded component image indicated by the identification number.

In the motion picture coding apparatus for coding a plurality of component motion pictures, a reference component image identification number used for prediction coding is coded, a reference image is selected out of a plurality of component images in accordance with the identification number, and image quality of the coded component image indicated by the identification number can be improved. Therefore, coded data with hierarchy of image quality can be formed.

Preferably, the reference image identification number coding unit sets a flag off when the identification number indicates a component image which is being coded, sets the flag on when the identification number indicates a component image which is different from a component image which is being coded, codes the flag only when the flag is off, and codes the flag and the identification number when the flag is on. As a result, the number of bits necessary for coding the identification number can be reduced.

Preferably, the reference image identification number coding unit sets a flag off when the identification number is not changed from a previous frame, sets the flag on when the identification number is changed from the previous frame, codes the flag only when the flag is off, and codes the flag and identification number when the flag is on. Therefore, the number of bits necessary for coding the identification number can be reduced.

Preferably, the motion image coding apparatus includes a comparing unit for comparing an identification number of a reference image with an identification number of a component image which is being coded, a flag generating unit for generating an off flag when the identification number of the reference image is the same as the identification number of the component image which is being coded and generating an on flag when the identification numbers are different from each other, and a flag coding and reference image identification number coding unit for coding the flag only when the flag is off and coding both the flag and the identification number of the reference image when the flag is on. Therefore, the number of bits necessary for coding the identification number can be reduced.

More preferably, the motion picture coding apparatus includes a memory for storing a reference image identification number of a preceding frame, a comparing unit for comparing a reference image identification number of the present frame with the reference image identification number of the preceding frame read from the memory, a flag generating unit for generating an off flag when reference image identification numbers of the preceding frame and present frame are the same and generating an on flag when the numbers are different, and a flag coding and reference image identification number coding unit for coding the flag only when the flag is off and for coding both the flag and reference image identification number of the present frame when the flag is on. As a result, the number of bits necessary for coding the identification number can be reduced.

More preferably, the flag is a 1 bit signal. Since coding determination is possible by only one bit of signal, a motion picture coding apparatus having simple structure can be provided.

According to a still further aspect of the present invention, the motion picture decoding apparatus for decoding the data coded by the motion picture coding apparatus described above includes a reference image identification number decoding unit for decoding an identification number of a reference component image for prediction coding, a reference image selecting unit for selecting a reference image out of a plurality of component images in accordance with the identification number, and an image quality improving unit for improving image quality of already decoded component image. Since the motion picture decoding apparatus includes the above described components, hierarchical decoding can be implemented. Therefore, it is possible to perform edition of component images efficiently by using low quality component images only, or to hierarchically improve image quality of a selected area of the motion picture, for example.

Preferably, the reference image identification number decoding unit decodes a flag among coded data of the identification number, regards the number of component image being decoded as the identification number when the flag is off, and decodes coded data of the identification number when the flag is on. Therefore, the data coded by the above-described motion picture coding apparatus can be decoded.

Preferably, the reference image identification number coding unit of the motion picture decoding apparatus decodes the flag among the coded data of the identification number, regards the reference image identification number used in a preceding frame as the present reference image identification number when the flag is off, and decodes coded data of the identification number when the flag is on. As a result, the data coded by the above-described motion picture coding apparatus can be decoded.

More preferably, the motion picture decoding apparatus includes a flag decoding unit for decoding a flag among coded data, a reference image identification number decoding unit for decoding the reference image identification number among the coded data, and regards the identification number of the component image which is being coded as the identification number of the reference image when the decoded flag is off, and regards result of decoding by the reference image identification number decoding unit as the reference image identification number when the flag is on.

More preferably, the motion picture decoding apparatus includes a flag decoding unit for decoding a flag among the coded data, a memory for storing a reference image identification number of a frame, and a reference image identification number decoding unit for decoding the reference image identification number among the coded data, regards the reference image identification number read from the memory as the identification number of the reference image of the present frame when the decoded flag is off, and regards the result of decoding by the reference image identification number decoding unit as the reference image identification number of the present frame when the flag is on.

BEST MODE FOR CARRYING OUT THE INVENTION (1) First Embodiment

Figure 10:
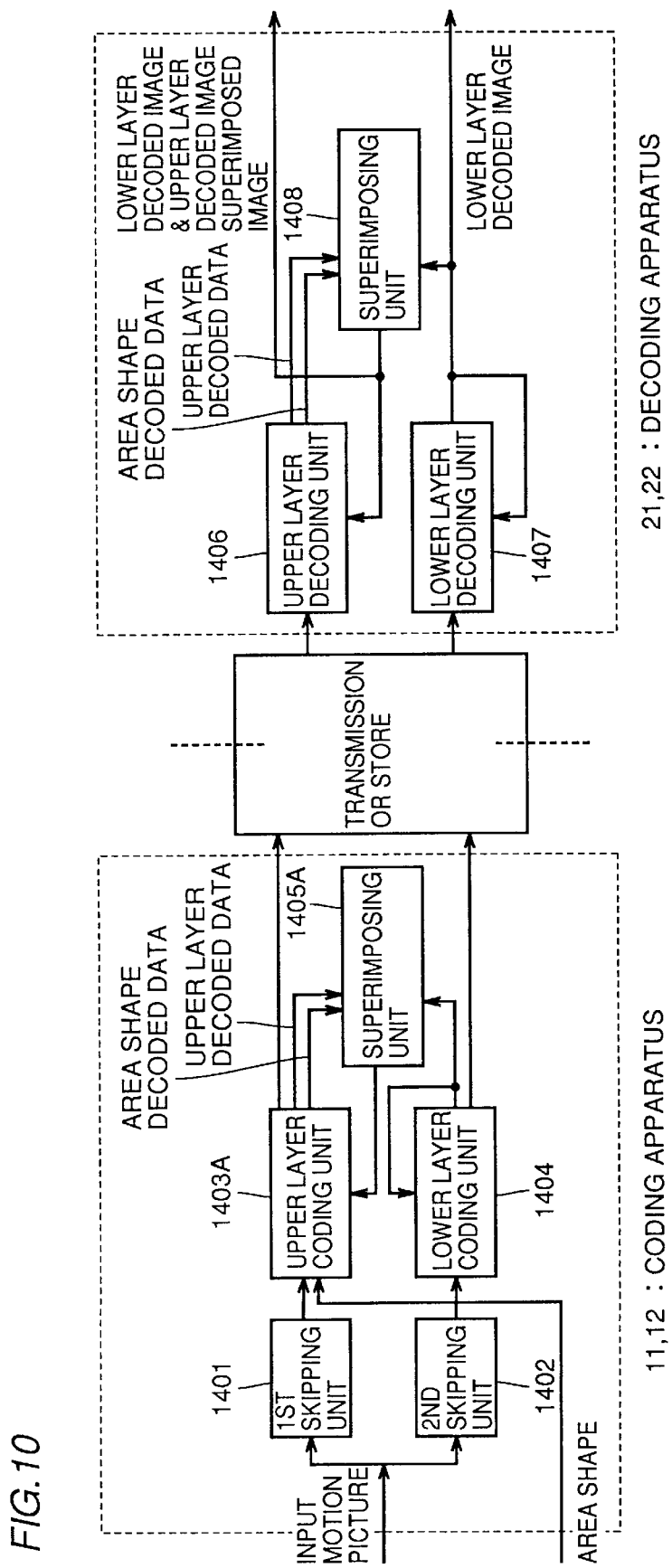
FIG. 10 is a block diagram showing a main portion of a picture coding and decoding apparatus in accordance with the present invention.
Figure 26:
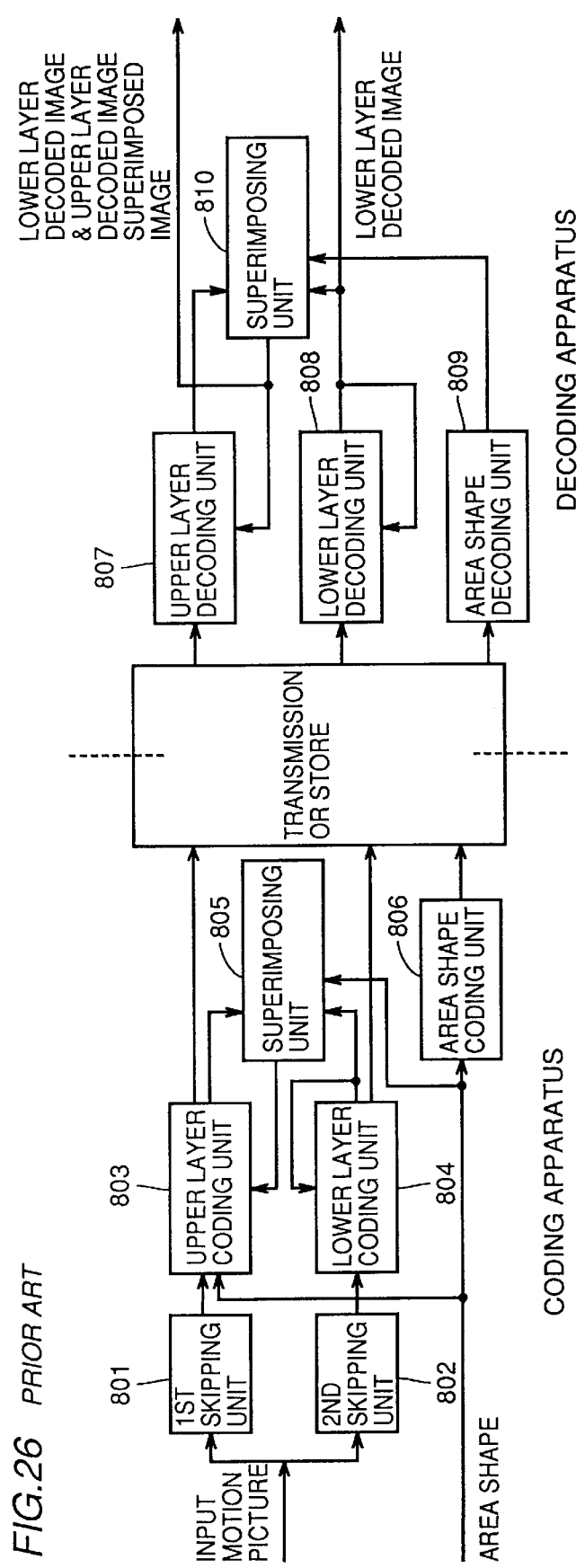
FIG. 26 is a block diagram illustrating conventional coding and decoding methods.
Figure 27:
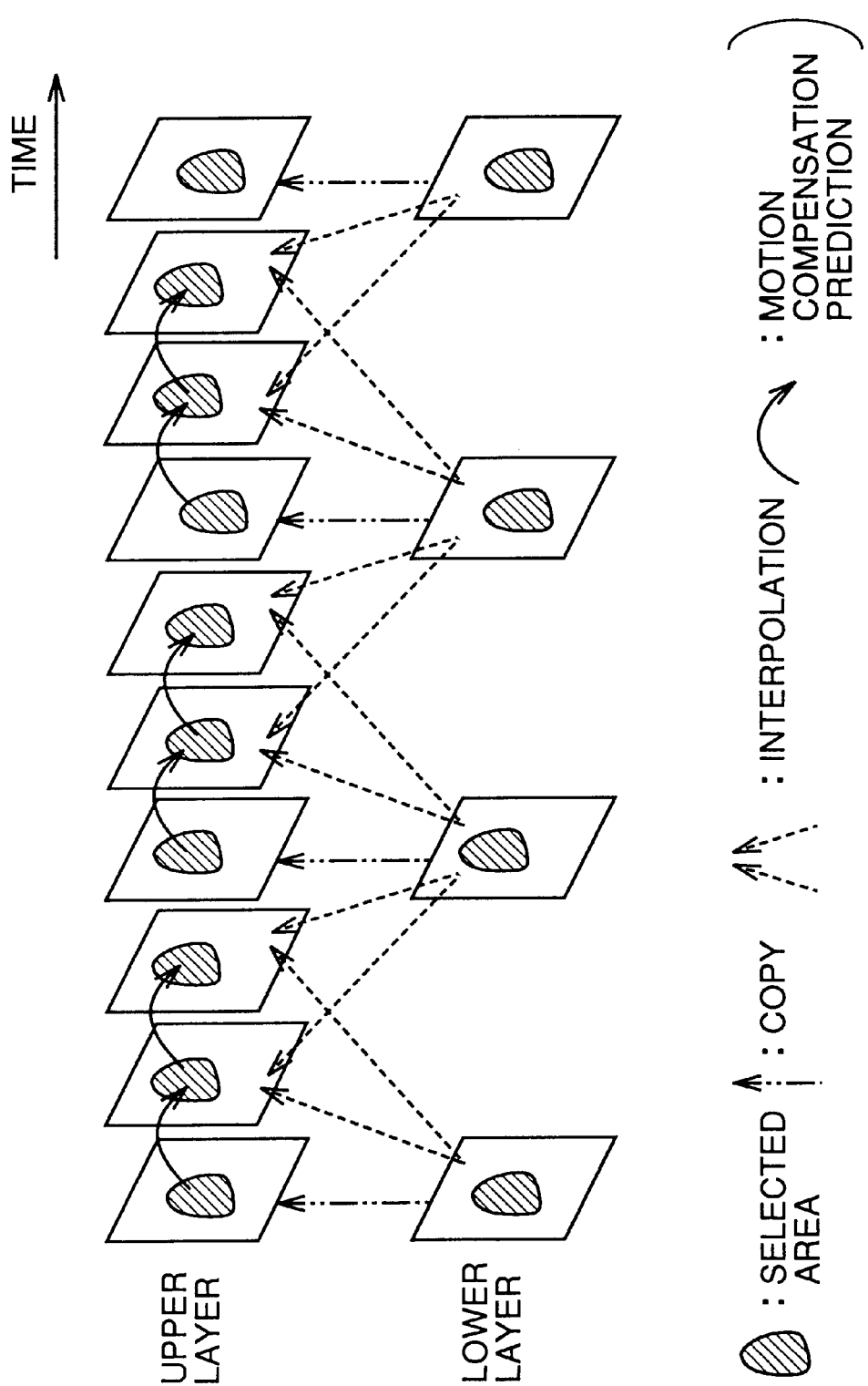
FIG. 27 shows concept of processing in the conventional picture coding and decoding apparatus.
Figure 28A:
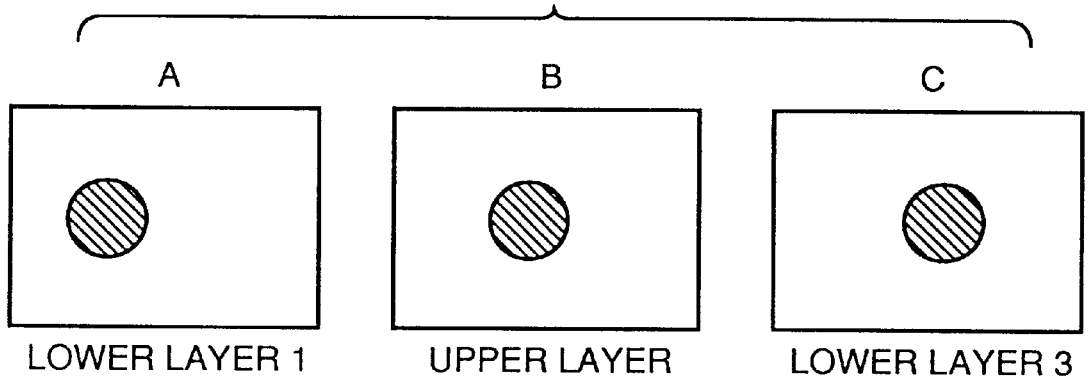
FIGS. 28A to 28C are illustrations related to problems of the conventional picture coding and decoding apparatus.
Figure 28B:
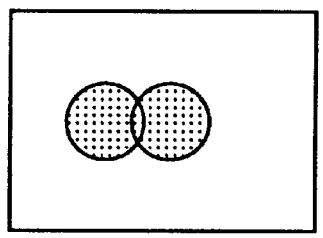
Figure 28C:
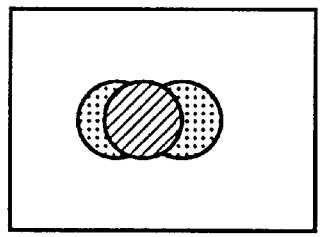
Figure 29:
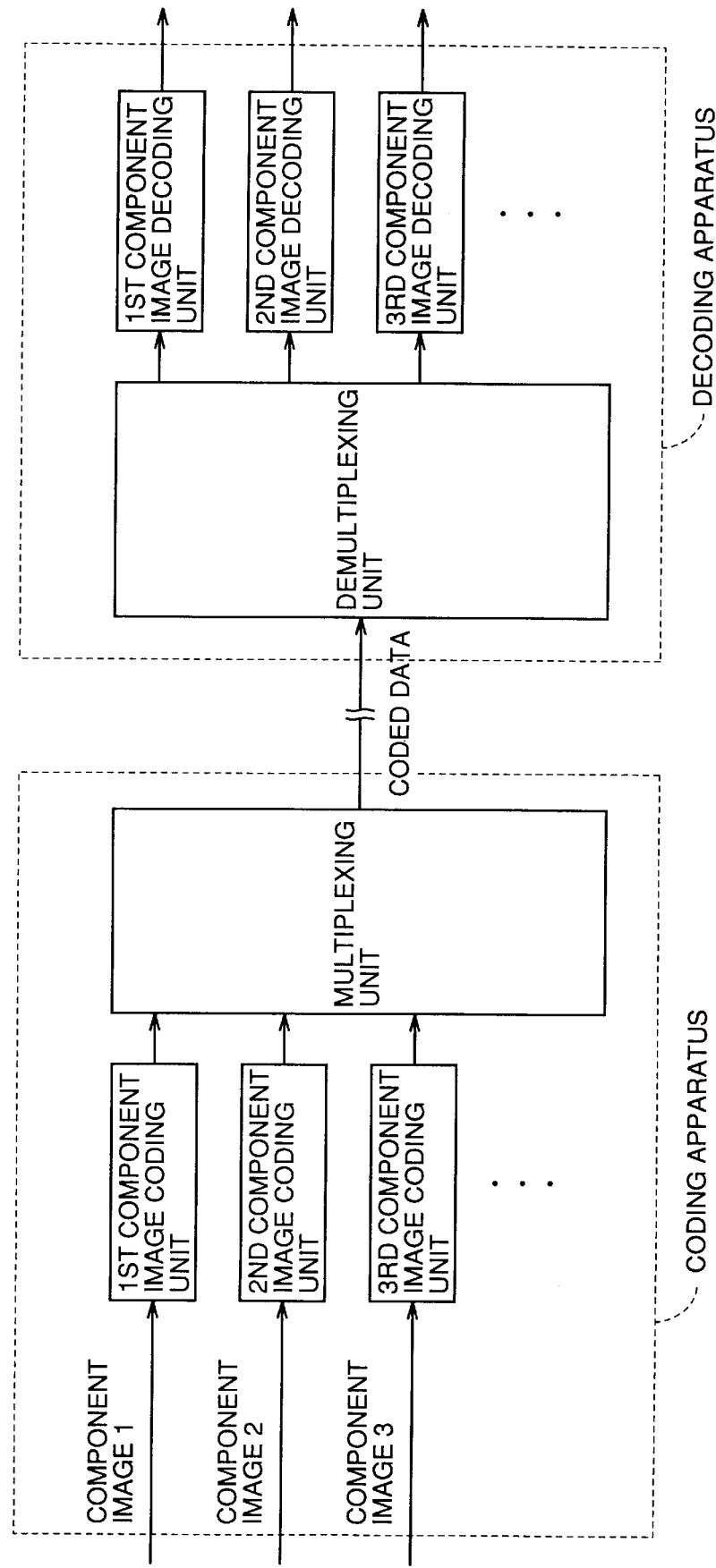
FIG. 29 is a block diagram showing a structure of a main portion of the conventional picture coding and decoding apparatus.
Figure 30A:
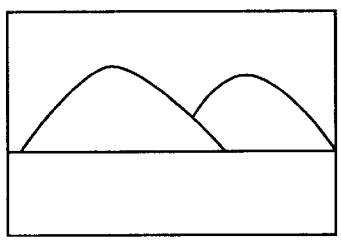
FIGS. 30A to 30E represent concept of component images and synthesizing of component images.
Figure 30B:
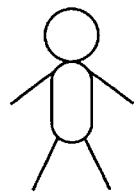
Figure 30C:
Figure 30D:
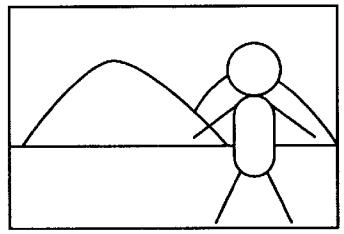
Figure 30E:
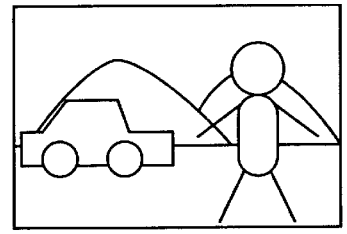

Embodiments of the present invention will be described with reference to the figures. FIG. 10 is a block diagram showing a schematic structure of the picture coding and decoding apparatus in accordance with the first embodiment of the present invention, which corresponds to FIG. 26 showing the prior art. Referring to FIG. 10, a coding apparatus 11 constituting the picture coding and decoding apparatus in accordance with the present invention includes first and second skipping units 1401 and 1402 to which motion pictures are input, an upper layer coding unit 1403A connected to the first skipping unit 1401 to which skipped image data and area shape data are input, a lower layer coding unit 1404 connected to the second skipping unit 1402 to which skipped data are input, and a superimposing unit 1405A connected to upper layer coding unit 1403A and lower layer coding unit 1404, for superposing images of these layers. A decoding apparatus 21 includes an upper layer decoding unit 1406 receiving data transmitted from coding apparatus 11 or stored, a lower layer decoding unit 1407, and a superimposing unit 1408 connected to upper layer decoding unit 1406 and lower layer decoding unit 1407 for superimposing respective decoded data. The superimposed image of the lower layer decoded image and upper layer decoded image superimposed at superimposing unit 1408 is fed to a next step. The lower layer decoded image decoded at the lower layer decoding unit 1407 is also fed to the next step.

In coding apparatus 11, operations of portions other than upper layer coding unit 1403A, superimposing unit 1405A, upper layer decoding unit 1406 and superimposing unit 1408 are the same as those of the prior art described with reference to FIG. 26, and therefore description thereof is not repeated.

Figure 1:
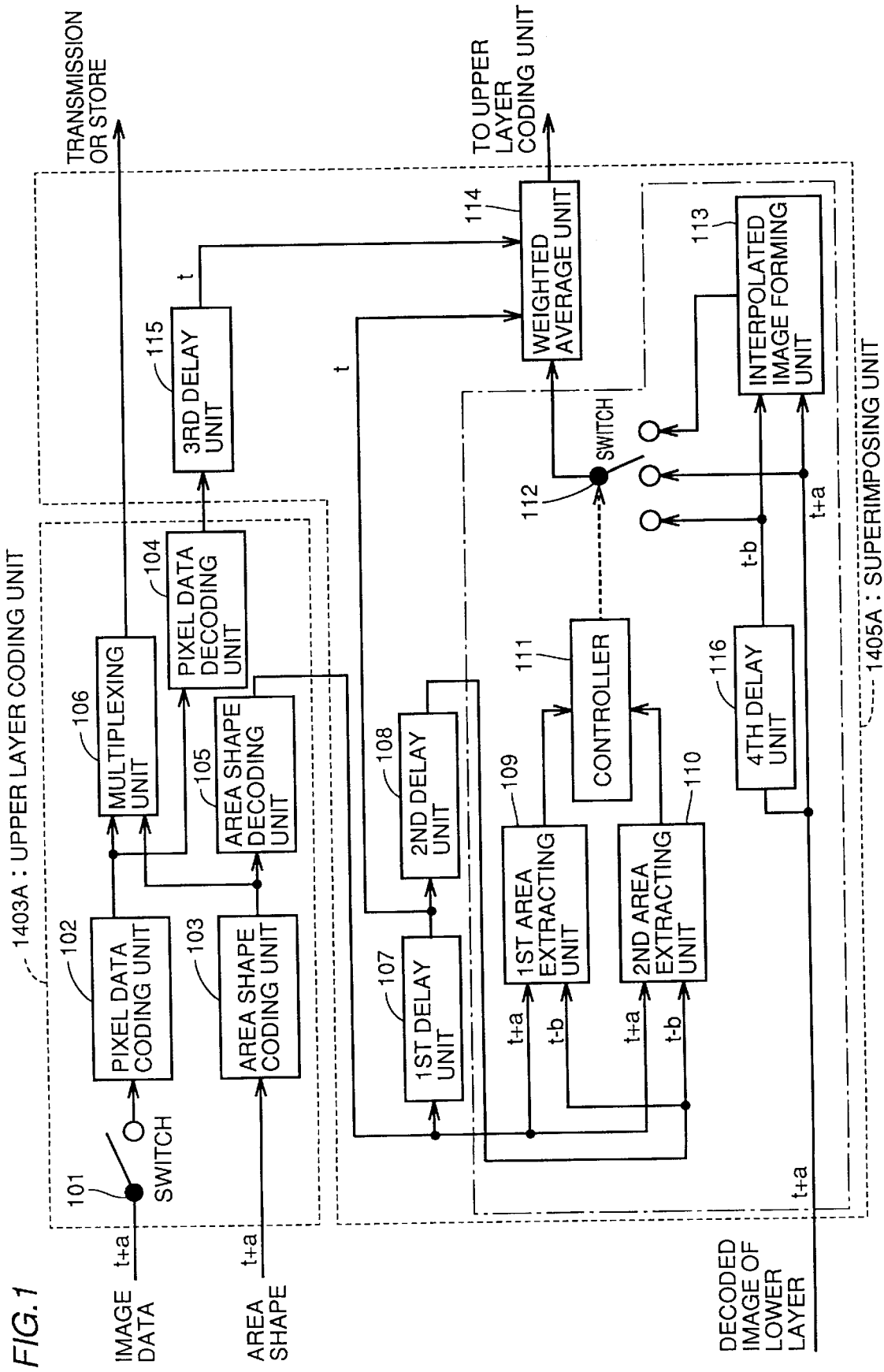
FIG. 1 is a block diagram showing a main portion of a picture coding and decoding apparatus in accordance with a first embodiment of the present invention.

Referring to FIG. 1, details of upper layer coding unit 1403A and superimposing unit 1405A, which are main portions of coding apparatus 11 in accordance with the first embodiment of the present invention will be described. Upper layer coding unit 1403A includes a pixel data coding unit 102 receiving as input pixel data through a switch 101, an area shape coding unit 103 receiving area shape data, a multiplexing unit 106 receiving image data from pixel data coding unit 102 and area shape coding unit 103, an area shape decoding unit 105 connected to area shape coding unit 103 for decoding area shape, and a pixel data decoding unit 104 connected to pixel data coding unit 102 for decoding pixel data.

Superimposing unit 1405A includes a first delay unit 107 connected to area shape decoding unit 105, first and second area extracting units 109 and 110, a second delay unit 108 connected to the first delay unit 107, a controller 111 connected to the first and second area extracting unit 109 and 110, a third delay unit 115 connected to pixel data decoding unit 104, and weighted average unit 114 connected to a switch 112, data from the first delay unit 107 and to the third delay unit 115. An output from weighted average unit 114 is transmitted to upper layer coding unit 1403.

Superimposing unit 1405A further includes a fourth delay unit 116 receiving images from lower layer coding unit 1404, and an interpolated image forming unit 113. An output from the fourth delay unit 116, the output from lower layer coding unit 1404 and the output from interpolated image forming unit 113 are switched by switch 112 and connected to weighted average unit 114. Controller 111 controls to which output the switch 112 is to be connected. Superimposing unit 1408 of decoding apparatus 21 has the same structure as superimposing unit 1405A of coding apparatus 11, and operates in the same manner. The output of weighted average unit 114 is, however, input to upper layer decoding unit and displayed on a display, for example.

Operation of the first embodiment of the present invention will be described with reference to FIG. 1.

Switch 101 of upper layer coding unit 1403A switches between modes for coding and not coding pixel values of an upper layer, under the control of a controller, not shown. More specifically, when a lower frame corresponding to the same frame position as the upper layer is coded, the switch is controlled to be turned off, so that pixel values of the upper layer are not coded. When the lower layer frame corresponding to the same frame position as the upper layer is not coded, the switch is controlled to be on, so that pixel values of the upper layer are coded.

When switch 101 is on, pixel data coding unit 102 codes the pixel data of the upper layer. As the method of coding, internationally standardized method such as MPEG or H.261 is used. At the time of coding, however, area shape data is input through a signal line, not shown, from area shape decoding unit 105, and only the pixel data in the area are coded. Area shape coding unit 103 codes area shape by the similar function as area shape coding unit 806 of FIG. 26 described with reference to the background art.

Pixel data decoding unit 104 decodes pixel data coded by pixel data coding unit 102. Here again, area shape data is input through a signal line, not shown, from area shape decoding unit 105, and decoding is performed based on the data. Decoded pixel data are input to the third delay unit 115 and fed back to the pixel data coding unit through a signal line, not shown, and utilized for prediction.

Area shape decoding unit 105 decodes area shape data coded by area shape coding unit 103, and outputs decoded data to first delay unit 107.

As descried above, in the upper layer coding unit in accordance with the present embodiment, whether the upper layer is coded or not is controlled by switch 101.

Superimposing unit 1405A of the present embodiment will be described in the following. The first delay unit 107 delays area shape data by a frames. The delayed area shape data is input to weighted average unit 114. The second delay unit 108 delays the area shape data further by b frames. Delayed area shape data is input to the first area extracting unit 109 and to the second area extracting unit 110. Area shape data not delayed is also input simultaneously to these circuits. Here, reference characters t+a, t, t−b on the signal line represent time points of respective frames. Here, t, a and b represent integers.

Figure 8A:
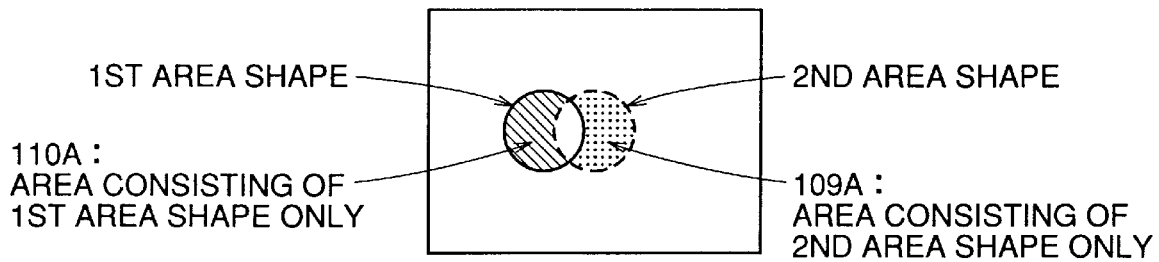
FIGS. 8A and 8B are illustrations showing effect of the first embodiment.

The first area extracting unit 109 extracts a second area and not a first area, based on first area information and second area information. This state will be described with reference to FIGS. 8A and 8B. FIG. 8A shows positional relation of the first and second area shapes with the area shapes decoded in accordance with the area shape data. The first area extracting unit 109 extracts screened portion 109A of FIG. 8A. The second area extracting unit 110 extracts that area which is the first area and not the second area based on the first area information and the second area information. In FIG. 8A, hatched portion 110A is extracted.

Controller 111 controls switch 112 based on outputs from the first area extracting unit 109 and second area extracting unit 110. More specifically, when the position of a pixel of interest is in the first area only, switch 112 is connected to the side of the decoded image at the frame time of (t+a), when the position of the pixel of interest is only in the second area, switch 112 is connected to the side of decoding at the frame time of (t−b), and otherwise, switch 112 is connected to an output from interpolated image forming unit 113.

The third delay unit 115 delays the decoded image data of the upper layer by a frames, and inputs decoded image data at time t to weighted average unit 114. The fourth delay unit 116 delays the decoded image data of the lower layer by (a+b) frames, and inputs to decoded image interpolated image forming unit 113 at time (t−b).

Interpolated image forming unit 113 calculates an interpolated image from the decoded image at the frame time (t−b) of the lower layer and the decoded image at time (t+a) of the lower layer in accordance with the equation (1) described with respect to the background art. In the equation (1), B(x, y, t1) represents a first decoded image, B(x, y, t2) represents the second decoded image, and I(x, y, t3) represents the interpolated image. Reference characters t1, t2 and t3 represent time points of the first and second decoded images and the interpolated image, respectively. Therefore, when the reference characters of FIG. 1 are used, t1=t−b, t2=t+a and t3=t.

Figure 8B:
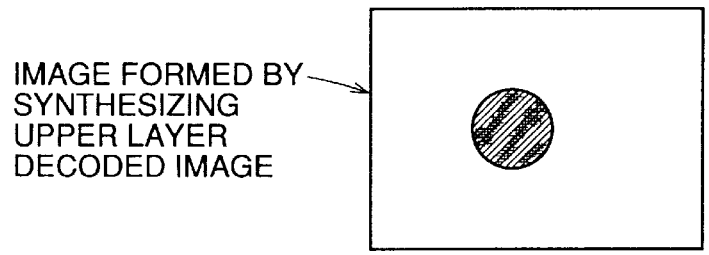

As described above, synthesizing of the lower layer is performed by switching of switch 112. Accordingly, in the example of FIG. 8A, the second decoded image (frame time t+a) is used for the hatched portion, and therefore the background pixels outside the selected area appear. For the screened portion, the first decoded image (frame time t−b) is used, and therefore background pixels outside the selected area appear. At other portions, interpolated image of the first and second decoded images appears. Since the decoded image of the upper layer is superimposed by weighted average unit 114 of FIG. 1 on the lower layer synthesized in this manner, the superimposed image does not have any after image around the selected area (hatched portion) as shown in FIG. 8B, and therefore an image almost free of any distortion is obtained. Weighted average unit 114 shown in FIG. 1 superimposes, by weighted average, the above-described interpolated image and the decoded image of the upper layer. The method of superimposing is similar to the content described with reference to the background technique, and therefore description thereof is not repeated.

Figure 11:
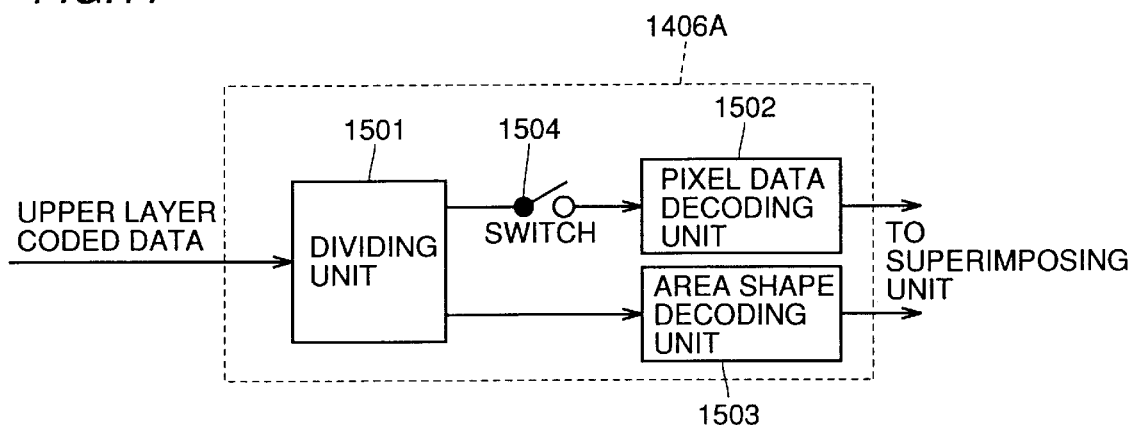
FIG. 11 is a block diagram illustrating the first embodiment of the present invention.

FIG. 11 is a block diagram showing components constituting upper layer decoding unit 1406 of decoding apparatus 21 shown in FIG. 10. Referring to FIG. 11, upper layer decoding unit 1406 includes a dividing unit 1501, a pixel data decoding unit 1502 connected to dividing unit 1501 through a switch 1504, and an area shape decoding unit 1503 connected to dividing unit 1501. Dividing unit 1501 divides upper layer coded data to coded pixel data and coded area shape data. Switch 1504 is turned off at a frame position where only the lower layer is coded, and turned on at a frame position where only the upper layer is coded. Pixel data decoding unit 1502 decodes pixel data of the upper layer, and outputs the decoded pixel to superimposing unit 1408. Area shape decoding unit 1503A decodes area shape coded data, and outputs the decoded pixel to superimposing unit 1408. Superimposing unit 1408 superimposes the upper layer on the lower layer by the same function as superimposing unit 1405.

(2) Second Embodiment

The second embodiment of the present invention will be described in the following. In the present embodiment, a mode in which the area shape is not coded by the upper layer coding unit is provided, so as to reduce number of bits for coding. When the area shape does not at all or hardly changes with time, the number of bits can significantly be reduced when the method of the second embodiment is used.

Figure 2:
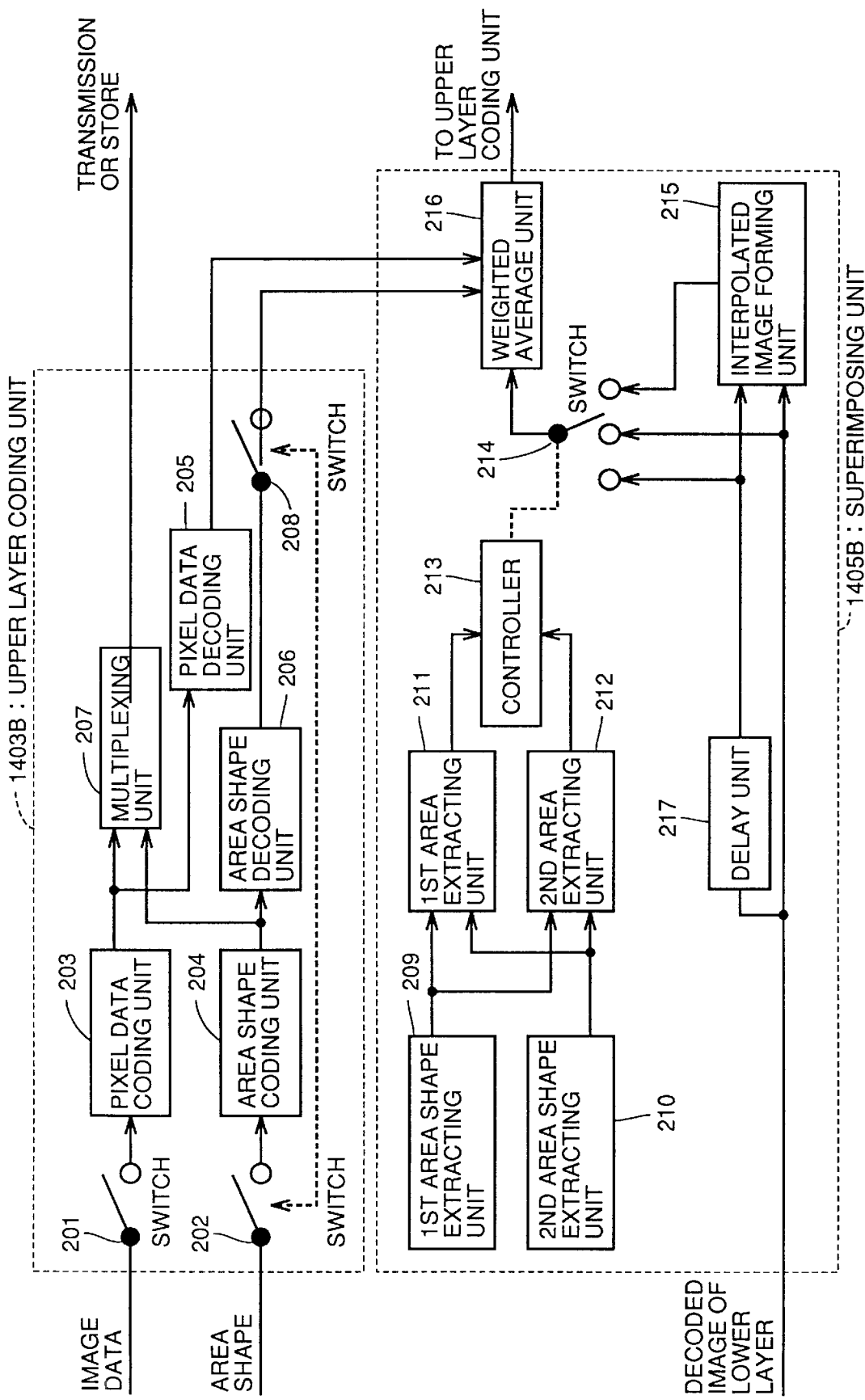
FIG. 2 is a block diagram showing a main portion of a picture coding and decoding apparatus in accordance with a second embodiment of the present invention.
Figure 12:
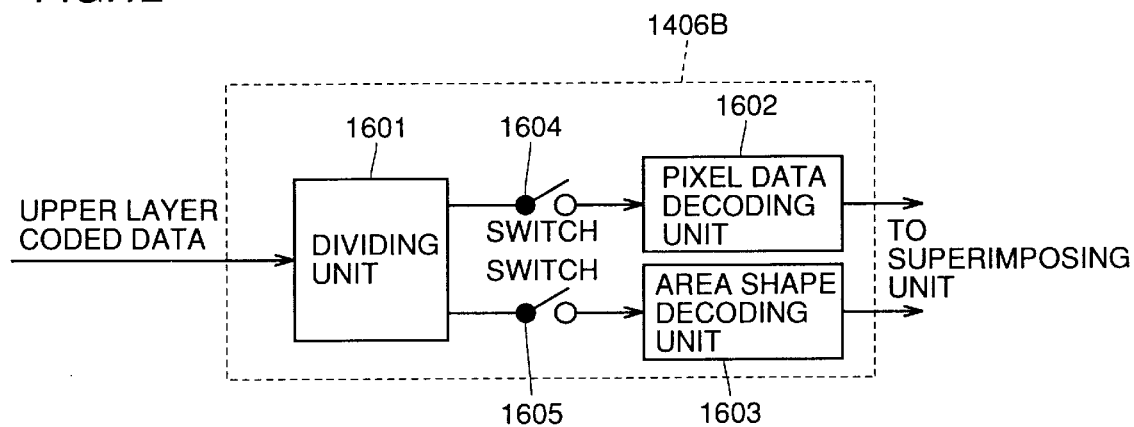
FIG. 12 is a block diagram illustrating the second embodiment of the present invention.

The second embodiment is depicted in FIGS. 2, 10 and 12. FIG. 10, which is used with reference to the first embodiment, is also applicable to the second embodiment. In the second embodiment, the picture coding and decoding apparatus is constituted by coding apparatus 12 and decoding apparatus 22. Operations of upper layer coding unit 1403B, upper layer decoding unit 1406B, superimposing unit 1405B and superimposing unit 1408B of FIG. 10 are different from the operations of the first embodiment. Differences in operation will be described in the following.

FIG. 2 is a block diagram showing structures of upper layer coding unit 1403B and superimposing unit 1405B of the second embodiment. A switch 201 constituting upper layer coding unit 1403B, a pixel data coding unit 203, an area shape coding unit 204, a pixel data decoding unit 205, an area shape decoding unit 206 and multiplexing unit 207 are similar to those of the first embodiment, and therefore description thereof is not repeated.

Switches 202 and 208 are controlled by a control unit, not shown, so that the switches turn on or off simultaneously. When a lower layer frame corresponding to the same frame position as the upper layer is coded, switches are turned on, and the area shape of the upper layer is coded. When the lower layer frame corresponding to the same frame position as the upper layer is not coded, the switches are turned off, and the area shape of the upper layer is not coded.

The first area shape extracting unit 209 extracts a first area shape based on the data obtained at coding apparatus 22. Similarly, second area shape extracting unit 210 extracts a second area shape based on the data obtained at decoding apparatus 22. Data obtained by decoding apparatus 22 include decoded image of the lower layer, and area shape of the upper layer when the area shape coding mode is on (switches 202 and 208 are on). Though not explicitly shown in FIG. 2, the data are input to each of the area shape extracting units 209 and 210, and utilized for extracting the area shape.

The first area extracting unit 211, the second area extracting unit 212, controller 203, switch 214, interpolated image forming unit 215 and weighted average unit 216 operate in the similar manner as those described in the first embodiment, and therefore description thereof is not repeated. Delay unit 210 operates similar to the fourth delay unit 216 of FIG. 1.

FIG. 12 is a block diagram showing components of the upper layer decoding unit in accordance with the second embodiment. Referring to the figure, upper layer decoding unit 1406B includes a dividing unit 1601 to which the upper layer coded data are input, and pixel data decoding unit 1602 and area shape decoding unit 1603 connected to dividing unit 1601 through switches 1604 and 1605, respectively. Difference between FIGS. 11 and 12 is that in the structure of FIG. 12, a switch 1605 is provided. Switch 1605 is off when there is not any coded data of the lower layer frame corresponding to the same frame position at the time of decoding the upper layer. Further, switch 1605 is on when the frame position is for decoding pixel data of the upper layer.

As described above, in the second embodiment, when the lower layer frame corresponding to the same frame position as the upper layer is not coded in the upper layer coding unit, switches 202 and 208 are turned off, so that area shape of the upper layer is not coded. Therefore, the amount of codes can be reduced.

In the first and second embodiments described above, on/off of coding pixel data is switched by switch 101 or 201. The switching is performed dependent on whether the lower layer frame corresponding to the same frame position as the upper layer is controlled or not, determined by a control unit not shown in FIGS. 1 and 2. The determination may be performed simultaneously in coding apparatuses 11, 12 and decoding apparatuses 21, 22. At least in the decoding apparatuses 21 and 22, however, the switches may be switched not using the control unit making such determination. The method will be described with reference to FIG. 3.

Figure 3:
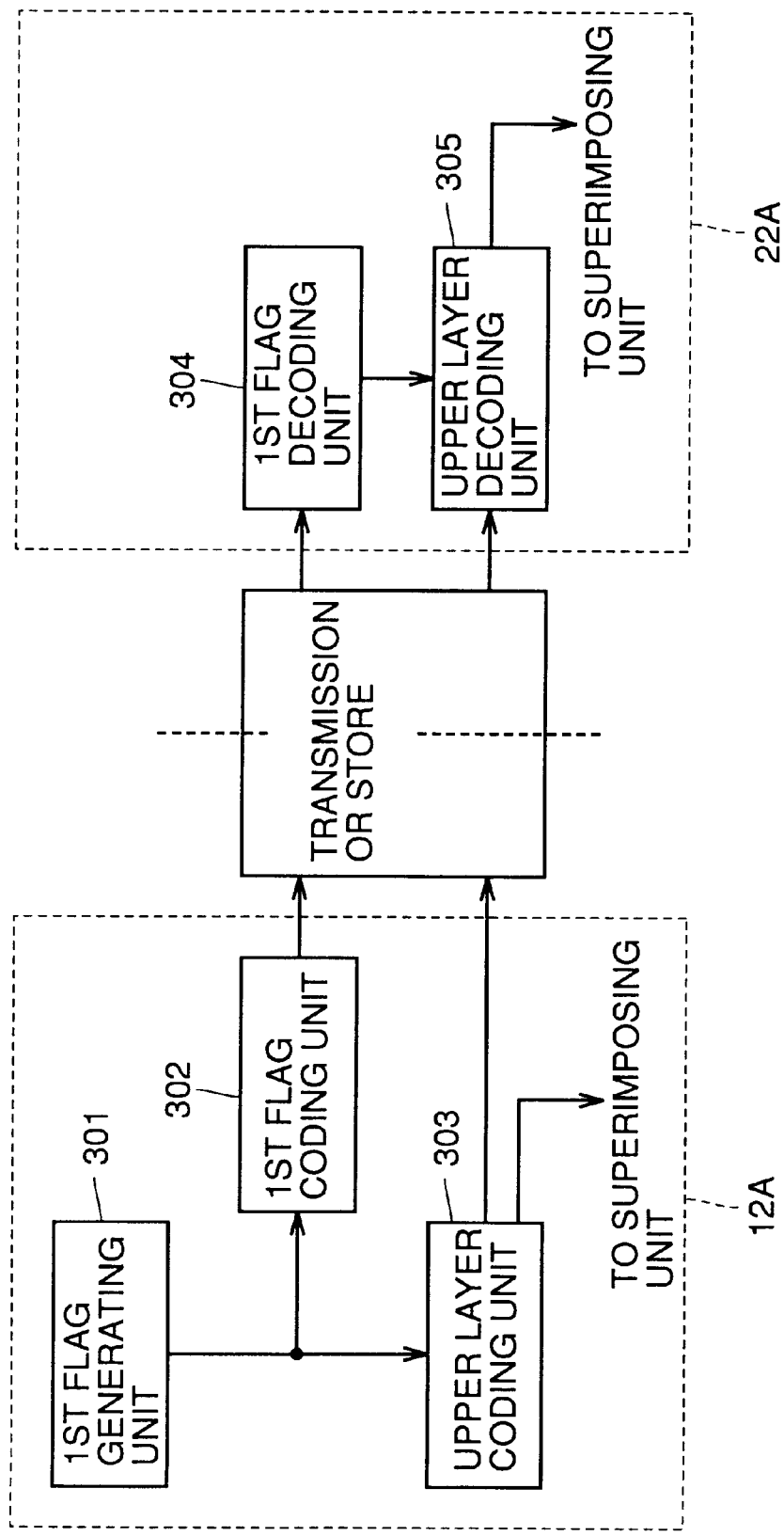
FIG. 3 is an illustration related to a first flag of the present invention.

FIG. 3 is a block diagram showing part of the picture coding and decoding apparatus in which a switch is switched not using a control unit. Referring to FIG. 3, coding apparatus 12A includes a first flag generating unit 301 and a first flag coding unit 302. A switch in upper layer coding unit 303 may be switched dependent on the flag.

Flag generating unit 301 determines whether or not the lower layer frame corresponding to the same frame position as the upper layer is coded, and generates a flag. The first flag coding unit 302 codes the first flag, and the coded data is multiplexed on coded data at a multiplexing unit, not shown, to be transmitted or stored. As a method of coding the flag, fixed length coding, variable length coding or the like is used.

The first flag decoding unit 304 of decoding apparatus 22A decodes the first flag from coded data, and outputs to upper layer decoding unit 305. For switching the switches 1504 and 1604 included in the upper layer decoding unit, the determination for switching described above is not made, but the switches are switched in accordance with the decoded first flag.

The area shape extracting unit in the second embodiment will be described. Here, the area shape is extracted based on the data obtained at decoding apparatus 22. The data obtained at decoding apparatus 22 include decoded data of the lower layer and decoded area shape data of the upper layer.

Figure 4:
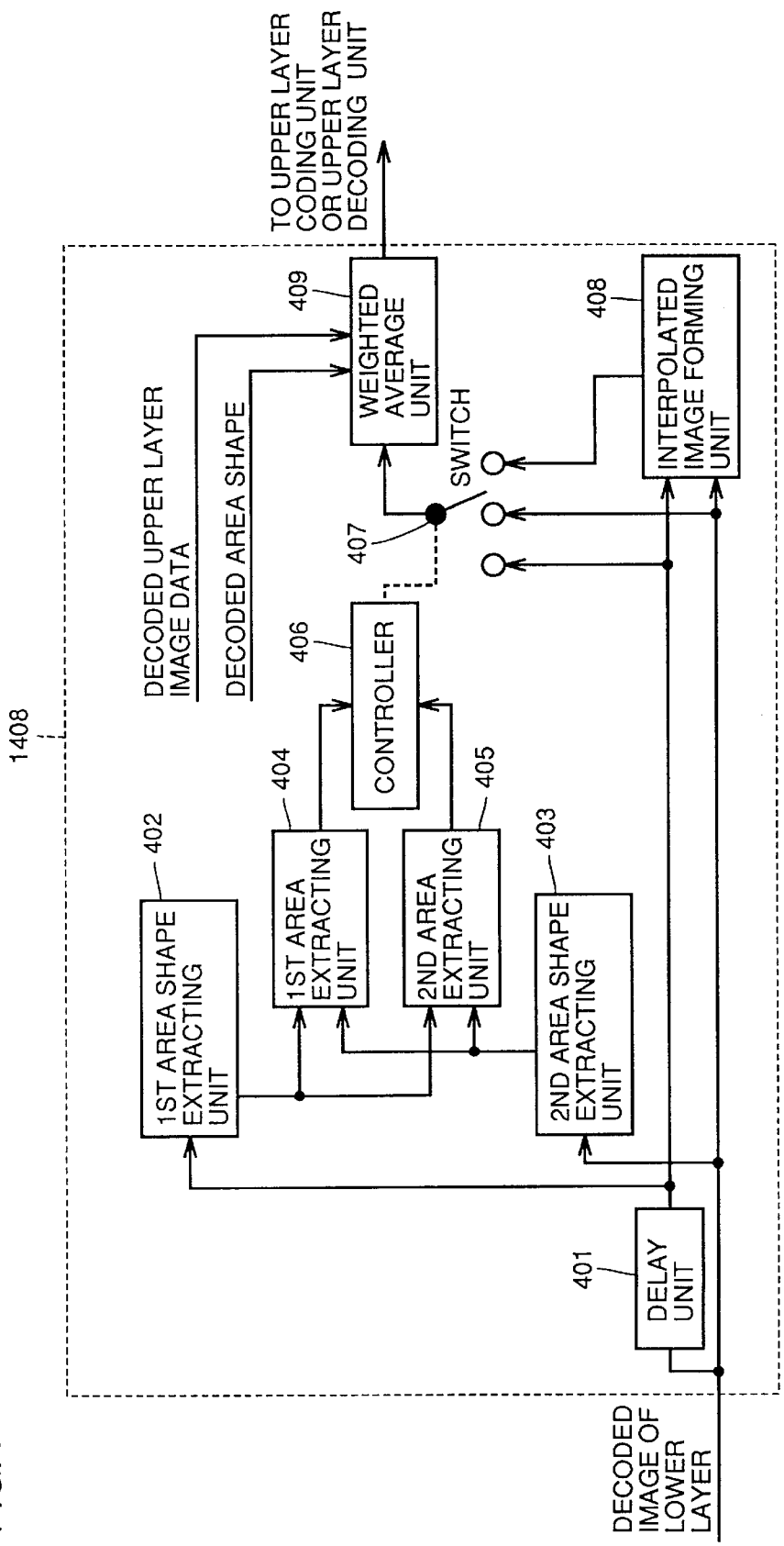
FIG. 4 is a block diagram showing a process when an area shape is extracted by using decoded data of a lower layer.

FIG. 4 is a block diagram showing a structure of superimposing unit 1408 when the area shape is extracted using the decoded data of the lower layer. To the first area shape extracting unit 402, a first decoded image of the lower layer delayed by delay unit 401 is input, and to the second area shape extracting unit 403, the decoded image of the lower layer is input without delay. The area shape extracting units each divide the areas of the input decoded images to cut out the area selection, and extract area shapes. As the method of area division, edge detection method utilizing differential operation, morphological segmentation or the like is used. Other portions of FIG. 4 function in the similar manner as FIG. 2. Therefore, description thereof is not repeated.

Figure 5:
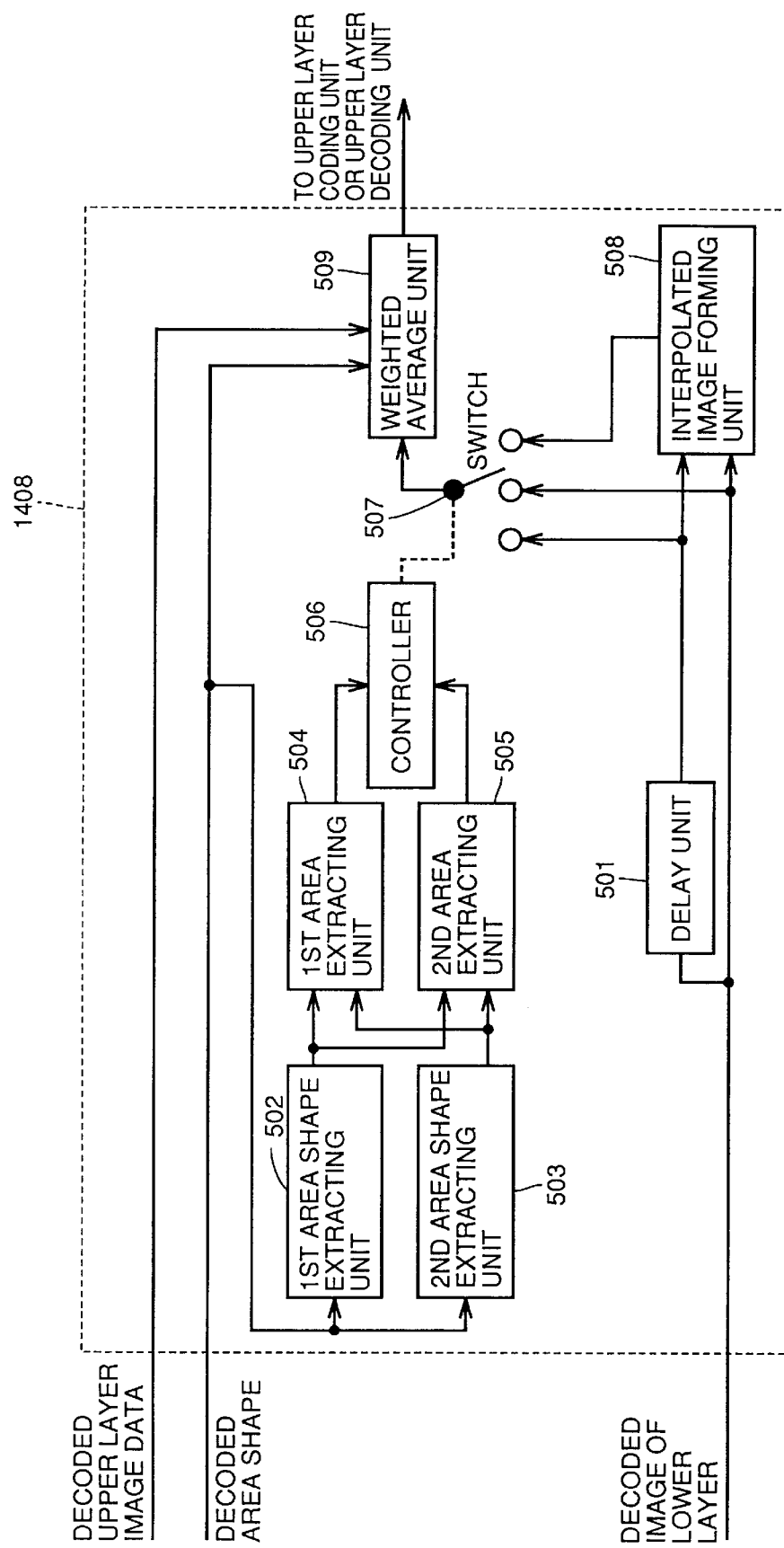
FIG. 5 is a block diagram showing a main portion when an area shape is extracted using an area shape of an upper layer.

FIG. 5 is a block diagram showing components of superimposing unit 1408 when upper layer decoded area shape is used as data obtained by the decoding apparatus. Referring to FIG. 5, superimposing unit 1408 includes first and second area shape extracting units 502 and 503 to which decoded area shapes are input, first and second area extracting units 504 and 505 connected to the first and second area shape extracting units 502 and 503, a controller 506 connected to the first and second area extracting units 504, 505, a delay unit 501 for delaying the decoded image of the lower layer, and an interpolated image forming unit 508 connected to delay unit 501. The superimposing unit further includes a weighted average unit 509. Weighted average unit 509 receives as inputs the decoded upper layer image data and decoded area shape data, and superimposes the decoded image of the lower layer delayed by delay unit 501, the decoded image of the lower layer not delayed, or the interpolated image formed by the interpolated image forming unit 508, by switching of switch 507 under the control of controller 506, on upper layer image data.

Figure 9:
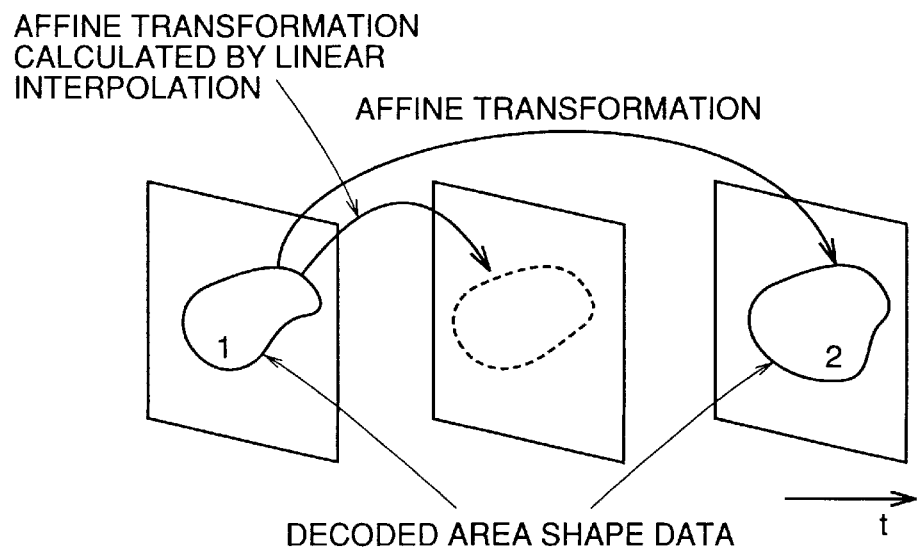
FIG. 9 is an illustration depicting extraction of an area shape using an area shape of an upper layer.

Referring to FIG. 5, when the area shape of the upper layer is coded, the decoded data is input to the first and second area shape extracting units 502 and 503. Each of the area shape extracting units 502 and 503 stores the decoded area shape, and extracts the area shape corresponding to the lower layer frame. Referring to FIG. 9, for example, a method is possible in which the area shape of the lower layer frame position is extracted by affine transformation representing translation, rotation, enlargement and reducing from decoded area shapes 1 and 2 of the upper layers preceding and succeeding the lower layer frame.

For this purpose, first, affine transformation from area shape 1 to area shape 2 is calculated. More specifically, an affine transformation parameter which approximates area shape 2 by transformation of area shape 1 is calculated. Thereafter, an affine transformation from area shape 1 onto the lower layer frame is calculated by linear interpolation of transformation coefficient. By using affine transformation, the area shape on the lower layer frame can be calculated. Other than affine transformation, prediction from area shape 1 to area shape 2 may be performed by block matching, and the area shape on the lower layer frame may be calculated by linear interpolation of the result. Alternatively, it is possible to use the area shape 1 or 2 as it is as the area shape on the lower layer frame.

In the second embodiment, switch 202 of FIG. 2 is turned off for the frame in which the lower layer is not coded, and switch 202 is turned on at a frame position where the pixel data of the upper layer is coded. However, different control may be possible. For example, change of the area shape with time may be examined and switch 202 may be turned off when there is hardly a change, and the switches may be turned on otherwise. When the switch is off, a copy of area shape data coded.decoded immediately before may be used as the decoded area shape data.

(3) Third Embodiment

Figure 6:
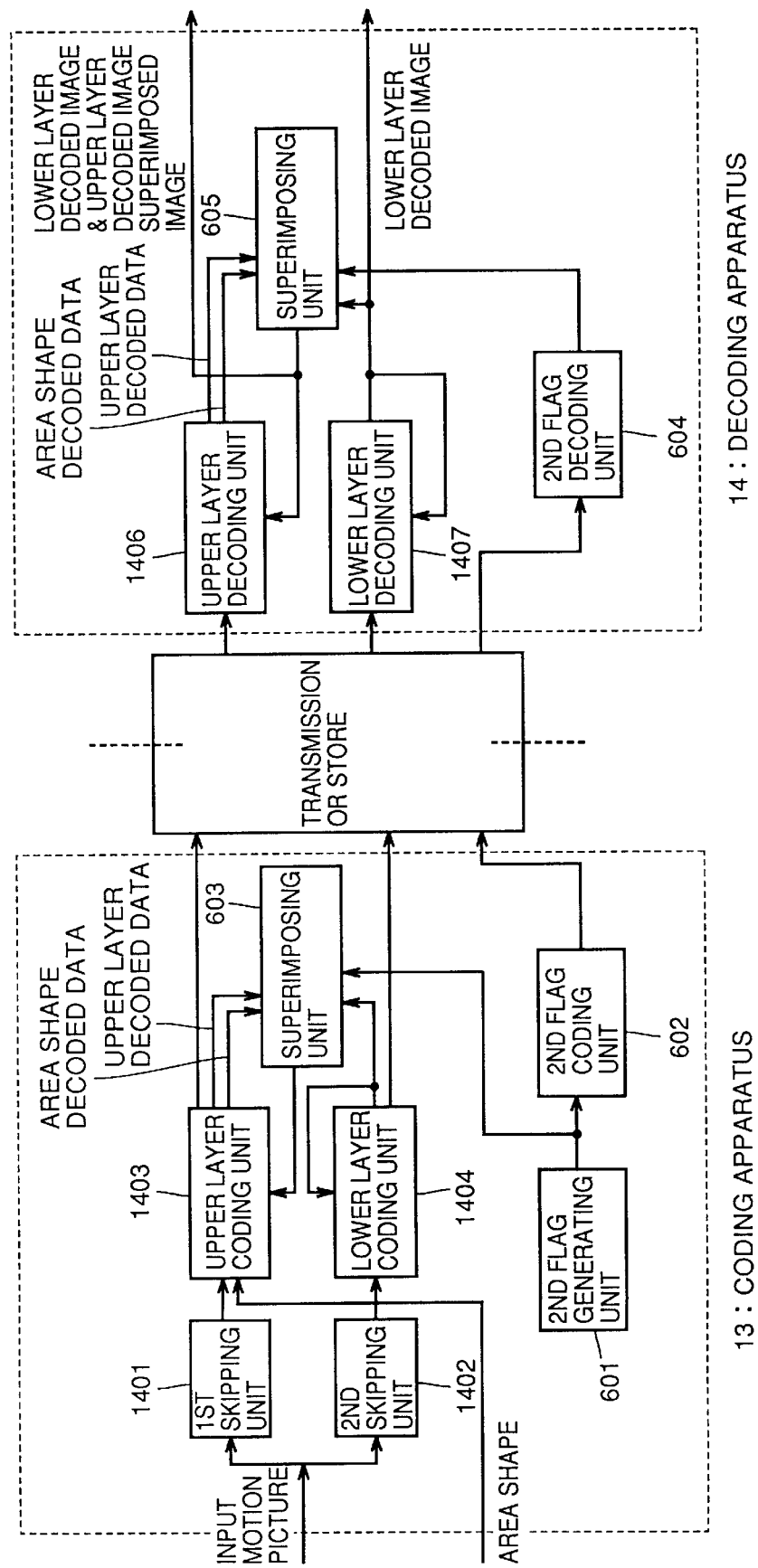
FIG. 6 is an illustration of a third embodiment of the present invention.

The third embodiment of the present invention will be described. In the third embodiment, a mode is provided in which synthesizing of the lower layer described in the first and second embodiments is not performed when there is not any decoded data of the lower layer corresponding to the frame position of the upper layer at the time of decoding the upper layer. If the area shape does not change much with time, for example, the problem described in the background art is negligible, and therefore synthesization of the lower layer frame is not necessary. Even if the area shape changes significantly, the mode in which synthesization of the lower layer is not performed may be selected, so as not to increase the amount of processing of the coding apparatus 13 and decoding apparatus 23 constituting the picture coding and decoding apparatus of the third embodiment. For this purpose, a second flag generating unit 601 and a second flag coding unit 602 are provided in the picture coding apparatus 13 as shown in FIG. 6, and a second flag decoding unit 604 is provided in picture decoding apparatus 23. In FIG. 6, components 1401, 1402, 1403, 1404, 1406 and 1407 are similar to those shown in FIG. 10.

The second flag generating unit 601 of FIG. 6 generates a flag indicating whether the lower layer frame is to be synthesized. Superimposing unit 603 switches operation for synthesizing and not synthesizing the lower layer frame, in accordance with the second flag. The second flag coding unit 602 codes the second flag, with the coded data multiplexed with coded data at a multiplexing unit, not shown, to be transmitted or stored. As to the method of coding the flag, fixed length coding, variable length coding or the like may be used.

The second flag decoding unit 604 in decoding apparatus 23 decodes the second flag from the coded data and outputs to superimposing unit 605. In superimposing unit 605, switching between whether the lower layer is to be synthesized or not is performed in accordance with the decoded second flag.

Figure 7:
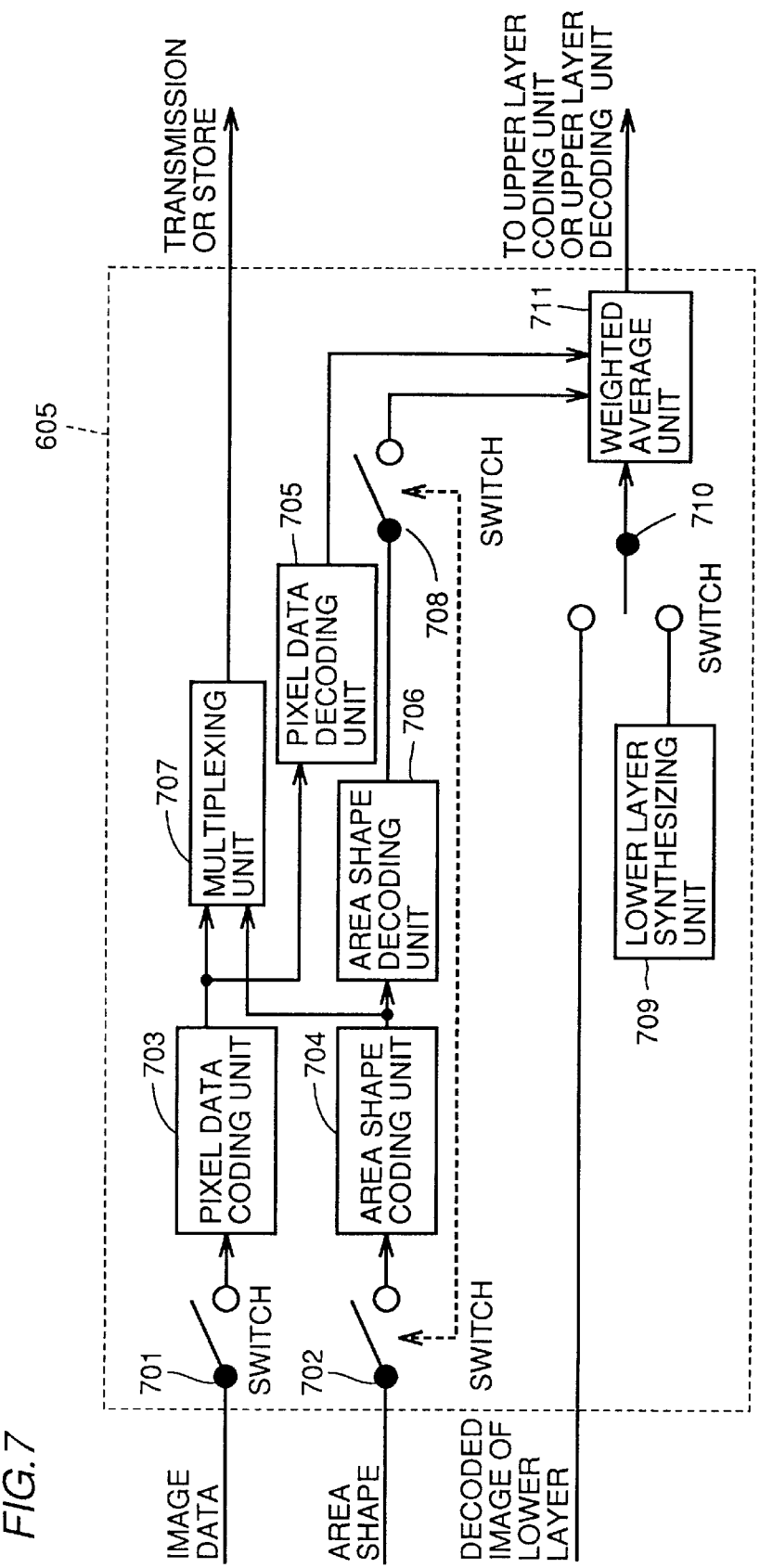
FIG. 7 is an illustration showing a modification of the third embodiment of the present invention.

When synthesizing of the lower layer is not performed in the third embodiment, either one of preceding and succeeding lower layer frames which have been coded and decoded in the lower layer is used in place of the synthesized lower layer frame. Circuit configuration in this case is shown in FIG. 7. FIG. 7 is a block diagram showing a main portion of superimposing unit 605 in this situation. Referring to FIG. 7, superimposing unit 605 includes a pixel data coding unit 703 receiving pixel data through a switch 701, an area shape coding unit 704 receiving area information through a switch 702, a pixel data decoding unit 705 connected to pixel data coding unit 703 and area shape coding unit 704, a multiplexing unit 707, an area shape decoding unit 706, and a weighted average unit 11 connected to pixel data decoding unit 705 and area shape decoding unit 706. Either the decoded image data of the lower layer or data of the lower layer synthesizing unit 709 is input through a switch 710 to weighted average unit 711.

The operation of the circuit shown in FIG. 7 will be described in the following. First, the decoded image of the lower layer or the lower layer frames synthesized by the lower layer synthesizing unit 709 is switched by switch 710 and input to weighted average unit 711. In the lower layer synthesizing unit 709 of FIG. 7, the lower layer frame is synthesized in accordance with the method described in the first and second embodiments. More specifically, synthesization of the lower layer performed by the portion surrounded by the chain dotted line in FIG. 1 takes place. Switch 710 is switched to the lower side when the lower layer synthesization is on and switched to the upper side when it is off, in accordance with the second flag described with reference to FIG. 6.

As the method of coding the area shape used for synthesizing the lower layer in the third embodiment may be the following. More specifically, at the frame position of the upper layer at which lower layer synthesization is to be performed, area shapes of lower layer at preceding and succeeding frame positions are coded at the present frame position. Structure of an upper layer coding unit 606 employing this method is shown in FIG. 13, and structure of the upper layer decoding unit 607 is shown in FIG. 14.

Figure 13:
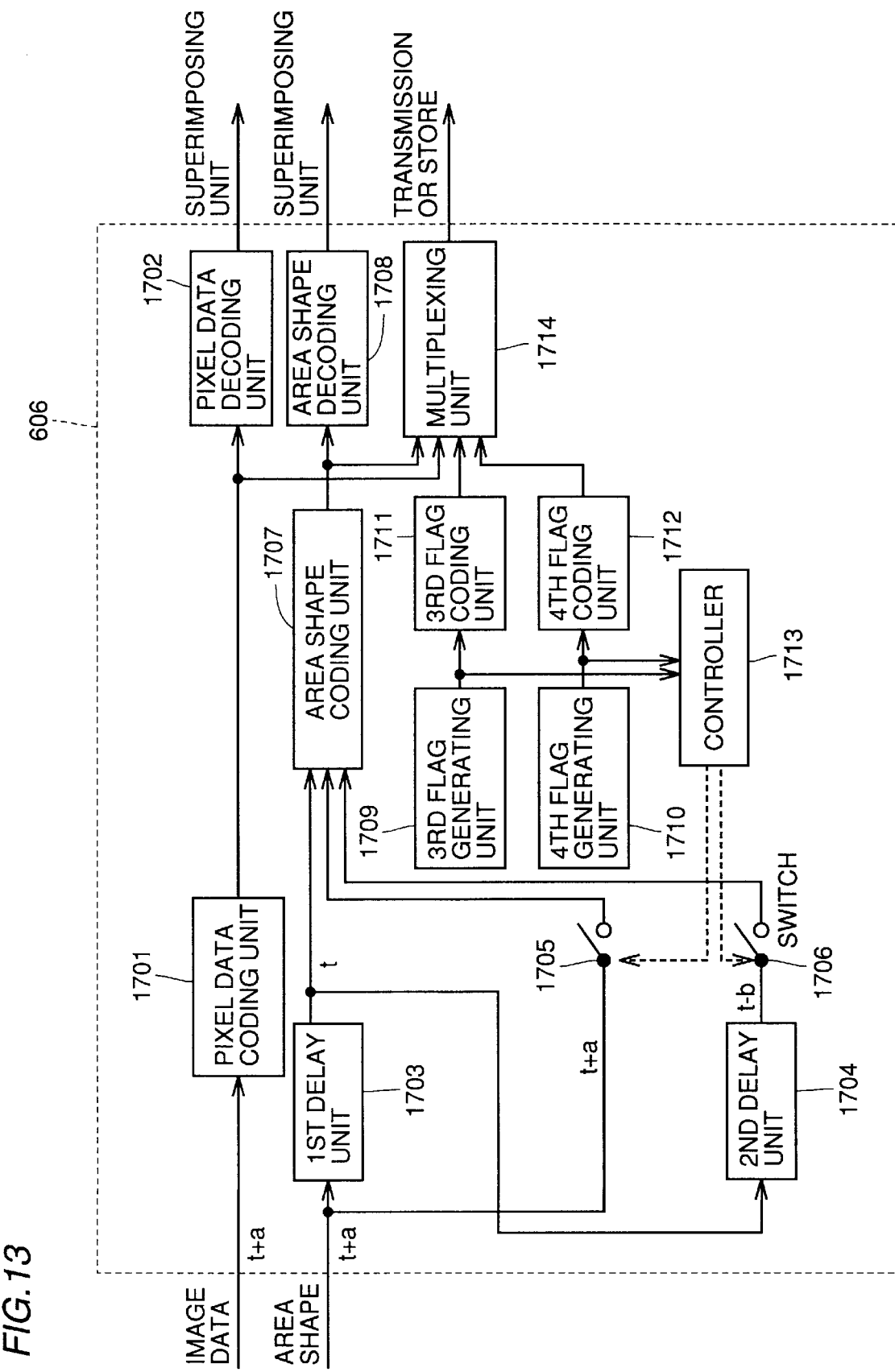
FIG. 13 is a block diagram showing an example of a structure of an upper layer coding unit.
Figure 14:
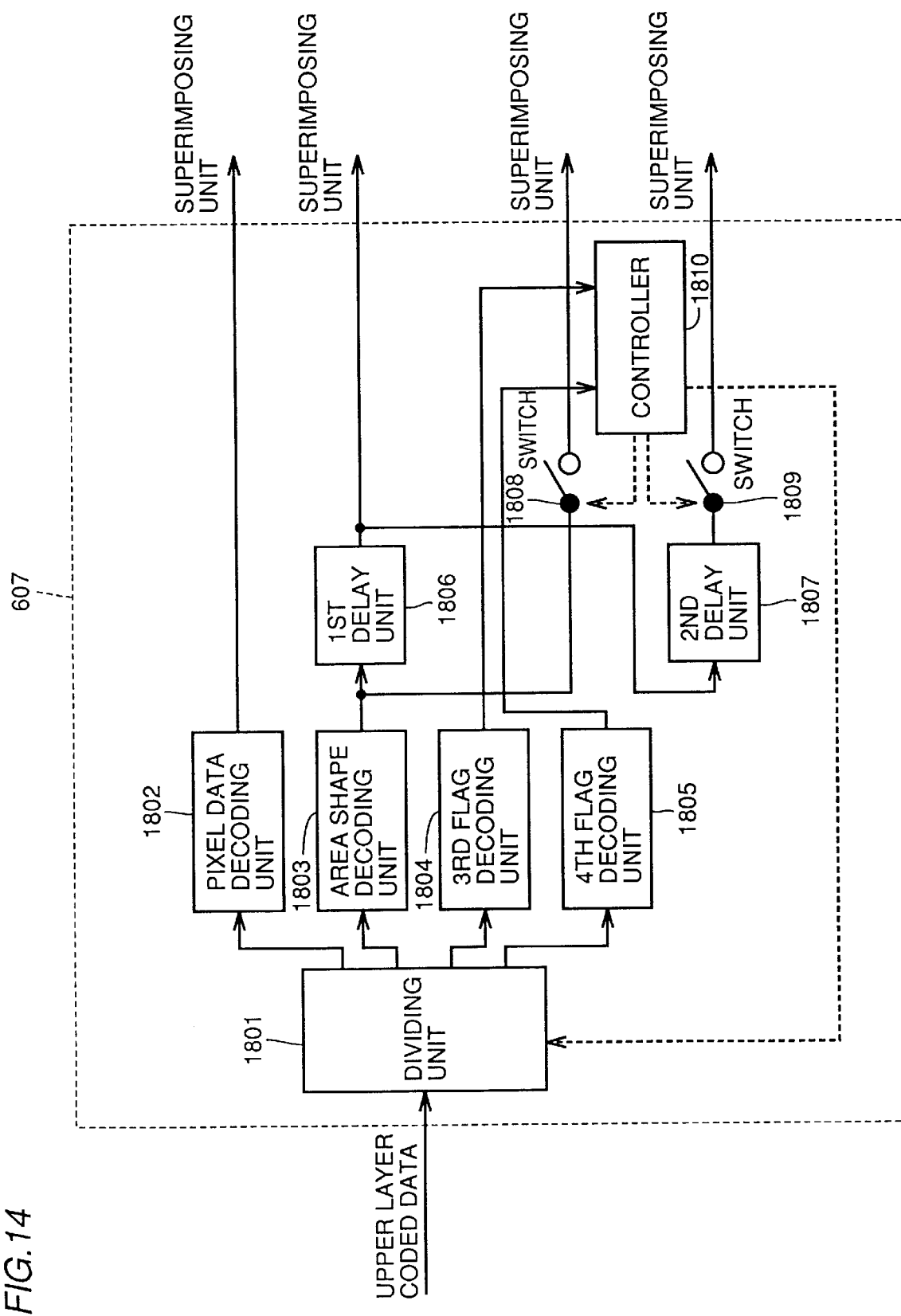
FIG. 14 is a block diagram showing an example of a structure of an upper layer decoding unit in accordance with the present invention.

Referring to FIG. 13, upper layer coding unit 606 includes pixel data coding unit 1701 receiving pixel data as input, a pixel data decoding unit 1702 connected to pixel data coding unit 1701, a first delay unit 1703 receiving as input the area shape data, a second delay unit 1704, an area shape coding unit 1707 connected to the first and second delay units 1703 and 1704, and an area shape decoding unit 1708 connected to area shape coding unit 1707. The upper layer coding unit further includes a third flag generating unit 1709, a fourth flag generating unit 1710, a third flag coding unit 1711 receiving information from these units, a fourth flag coding unit 1712, a controller, and a multiplexing unit 1714 receiving information from area shape coding unit 1707, the third flag coding unit 1711 and the fourth flag coding unit 1712.

Referring to FIG. 13, pixel data coding unit 1701 and pixel data decoding unit 1702 operate in the similar manner as those of the first embodiment, and therefore description thereof is not repeated. In FIG. 13, the area shape data is delayed by a frames at the first delay unit 1703, and further delayed by b frames at the second delay unit 1704.

The third flag generating unit 1709 and the fourth flag generating unit 1710 generates the third and fourth flags, respectively. The third flag indicates whether the area shape (referred to as area shape 2) at frame time t+a is to be coded. The fourth flag indicates whether the area shape (hereinafter referred to as area shape 1) at frame time t−b is to be coded or not. Controller 1713 controls switches 1705 and 1706 dependent on inputs of the third and fourth flags.

More specifically, when the third flag indicates coding of the area shape, switch 1705 is turned on, and otherwise the switch 1705 is turned off. When the fourth flag indicates coding of the area shape, switch 1706 is turned on and otherwise, switch 1706 is turned off. The third and fourth flag coding units perform coding of the third and fourth flags, respectively. As to the method of coding flags, fixed length coding, variable length coding or the like may be used.

Area shape coding unit 1707 encodes the area shape at a frame time when the area shape is input, and outputs coded data. Area shape decoding unit 1708 decodes the coded data of the area shape, and transmits the decoded area shape to the superimposing unit. Here, a structure such as shown in FIG. 1 is used for the superimposing unit. The first and second delay units 107 and 108 of FIG. 1, however, are not used. The decoded data of area shape 1 is input to the first and second area extracting units 109 and 110 of the superimposing unit, and similarly, the decoded data of area shape 2 is input to the first and second area extracting units 109 and 110. By contrast, the decoded data of the area shape corresponding to frame time t is input to weighted average unit 114.

Switches 1705 and 1706 are controlled to attain the following three combinations. Namely, both switches are on, both switches are off, and switch 1705 is on and switch 1706 is off. When synthesizing of the lower layer is to be performed for the first time, control is performed so that both switches are turned on whereby area shapes at preceding and succeeding frame positions, that is, area shapes 1 and 2 are coded.decoded, with the decoded area shapes input to the first and second area extracting units 109 and 110. When the area shapes which are the same as that used for the previous lower layer synthesization are to be used as the area shapes 1 and 2, control is performed so that both switches are turned off. In that case, area shapes 1 and 2 used for the lower layer synthesization are input to the first and second area extracting units 109 and 110 from a memory, not shown.

When area shape 2 used for the last lower layer synthesization is to be used as area shape 1 for the present lower layer synthesization and new area shape is to be used as area shape 2 for the present synthesization, control is performed so that switch 1705 is turned on and switch 1706 is turned off. In that case, area shape 2 used for the last lower layer synthesization is input as the area shape for the present synthesization, from a memory not shown, to the first and second area extracting units 109 and 110. The area shape 2 newly coded.decoded this time is input to the first and second area extracting units 109 and 110.

The pixel data at frame time t+a decoded by pixel data decoding unit 1702 of FIG. 13 is delayed by a frames at the third delay unit 115 in superimposing unit 1405A of FIG. 1, and thereafter input to weighted average unit 114. Multiplexing unit 1714 of FIG. 13 multiplexes area shape data and coded data of the third and fourth flags respectively, and outputs as coded data of the upper layer.

Upper layer decoding unit 607 for decoding the above described upper layer coded data will be described in the following with reference to FIG. 14. Referring to FIG. 14, upper layer decoding unit 607 includes a dividing unit 1801 to which upper layer coded data is input, a pixel data decoding unit 1802 connected to dividing unit 1801 and receiving data from dividing unit 1801, an area shape decoding unit 1803, third and fourth flag decoding units 1804 and 1805, a first delay unit 1806 connected to area shape decoding unit 1803, a controller 1810 for controlling switches 1808 and 1809 based on the data from the third and fourth flag decoding units 1804 and 1805, and a second delay unit 1807 connected to the first delay unit 1806.

Referring to FIG. 14, dividing unit 1801 divides the upper layer coded data into coded data of pixel data, area shape, and third and fourth flags. Pixel data decoding unit 1802, area shape decoding unit 1803, first delay unit 1806, second delay unit 1807 and switches 1808 and 1809 operate in the similar manner as those shown in FIG. 13, and therefore description thereof is not repeated.

The third and fourth flag decoding units of FIG. 14 decode the third and fourth flags respectively, and supply to controller 1810. Controller 1810 controls two switches in the similar manner as controller 1713 of FIG. 13, and in addition, controls dividing unit 1801 and taking of decoded data of the area shapes. More specifically, when the third flag indicates that area shape 1 has been coded, the controller controls such that the data of area shape 1 is separated from upper layer coded data, and otherwise, the data of area shape 1 is not separated from upper layer coded data, as there is not the data of area shape 1.

Similar control is performed on dividing unit 1801 with respect to the fourth flag. There are three combinations of on.off of the two switches, as in the upper layer coding unit 606 of FIG. 13. Operations for respective combinations are similar to those described with reference to FIG. 13.

In this manner, in the third embodiment, as a method of coding area shapes used for synthesizing the lower layer, at a frame position of the upper layer where synthesization of the lower layer is to be performed, area shapes of the lower layer of the preceding and succeeding frame positions may be coded at the present frame position.

In the embodiments described above, the image prepared by superimposing the lower layer frame with the upper layer frame is fed back to the upper layer coding unit as shown in FIG. 10 in the coding apparatus, and utilized for prediction coding of the upper layer. In the image decoding apparatus, it is utilized for prediction coding of the upper layer, and in addition, displayed on a display. However, the superimposed image may be used solely for display.

More specifically, in the coding apparatus, the superimposing units of the present embodiment is not provided, and the decoded image of the upper layer is directly fed back to the upper layer coding unit to be utilized for prediction coding. In the decoding apparatus, the decoded image of the upper layer is directly fed back to the upper layer decoding unit to be utilized for prediction, and in addition, input to the superimposing unit, with the output of the superimposing unit being displayed on a display, for example.

In the above described embodiments, coding of the area shape has been described as utilizing 8 directional quantization code. However, other method of shape coding may be used.

(4) Fourth Embodiment

Figure 15:
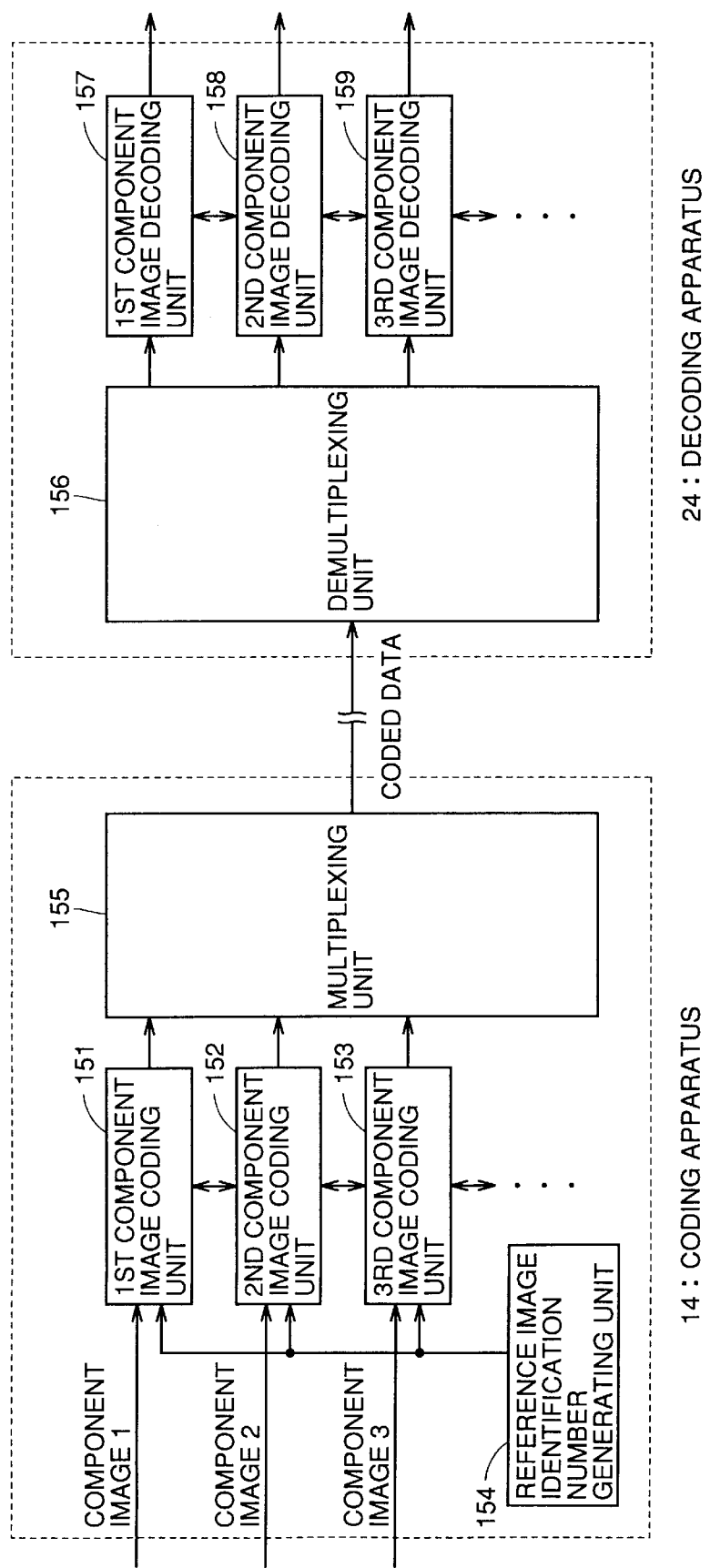
FIG. 15 is a block diagram showing a main portion of the picture coding and decoding apparatus in accordance with a fourth embodiment of the present invention.

FIG. 15 is a block diagram showing a main portion of the picture coding apparatus and decoding apparatus in accordance with the fourth embodiment. In the fourth embodiment, a plurality of component images are processed. Referring to FIG. 15, decoded image data are exchanged between a plurality of component image coding units. For example, it is made possible for the second component image coding unit 152 to utilize decoded image data of the first component image coding unit 151. Similarly, it is made possible for the third component image coding unit 153 to utilize the decoded image data of the second component image coding unit. For simplicity, in FIG. 15, decoded image data are shown as reference by adjacent component image coding units only. However, actually, it is possible to refer to the data of distant component image coding units.

A reference image identification number generating unit 154 of FIG. 15 generates a signal indicative of an identification number r of the component image to be referenced. This may be automatically generated, or generated by user designation.

Figure 22:
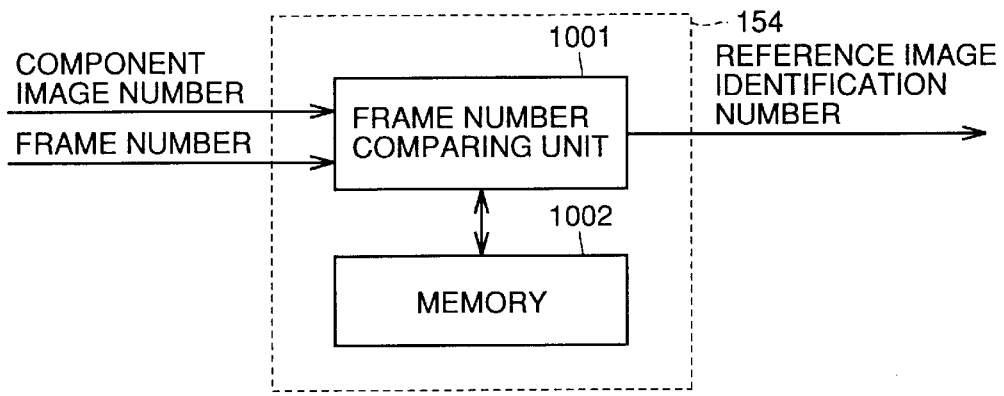
FIG. 22 is a block diagram showing a structure of a reference image identification number generating unit.

FIG. 22 shows an example of the structure of the reference image identification number generating unit. A frame number comparing unit 1001 reads a component number and a frame number stored in a memory 1002, and compares with an input frame number, so as to generate the reference image identification number.

In frame number comparing unit 1001, the frame number of the input image is compared with the frame number of each of the component images which have been already coded, and the component image number to which a closest key coded frame belongs is output as the reference image identification number r. When there are a plurality of closest key coded frames, the one having larger component image number is output as the reference image identification number r.

Figure 23:
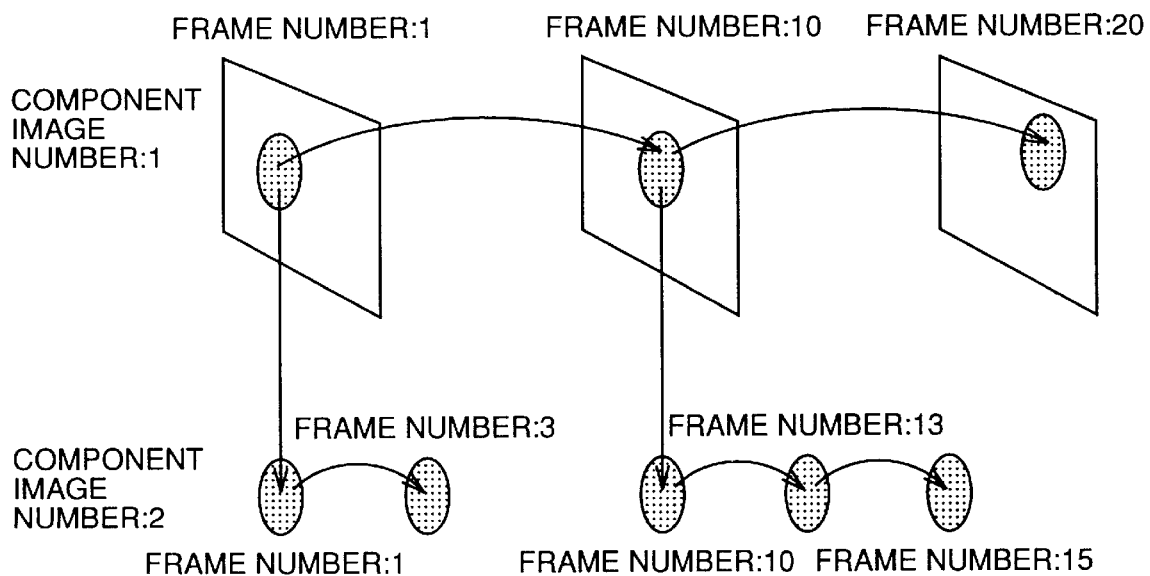
FIG. 23 is an illustration showing relation of reference between component images and motion compensation prediction thereof.

The operation using the reference image identification number will be described. FIG. 23 shows component images and reference relation of motion prediction thereof. Table 1 shows relation between component image numbers, frame numbers and the reference image identification numbers r. Referring to FIG. 23, an image of component image number 1 (component image 1) is a motion picture including an object (screened portion) and a background. An image of component image number 2 (component image 2) is a motion picture of an arbitrary shape including only the object portion of component image 1. Referring to FIG. 23, frame numbers 1, 10, 20, . . . of component image 1 are coded, while frame numbers 1, 3, 10, 13, 15, . . . of component image 2 are coded. The arrows represent reference relation for motion compensation prediction.

Table 1 shows examples of reference image identification number r when the frame of each component image is coded. For coding component image 1, there is no other component image which has been already coded, and therefore, the reference image number is always the number of the component image which is being coded, that is, 1. Here, frame 1 (heading frame) is subjected to intra-frame coding, and therefore r is not generated. The component image number and the frame number are stored in memory 1002.

For the component image 2, 1 or 2 is used as the reference image identification number r. When frame 1 of component image 2 is input, frame number comparing unit 1001 compares the frame number read from memory 1002 with the present frame number, and regards frame 1 of component image 1, which is the closest frame as the reference image for prediction. Accordingly, frame number comparing unit 1001 outputs the component image number 1 of component image 1 as the reference image identification number. Memory 1002 stores component image number 2 and frame number 1.

When frame 3 of component image 2 is input, frame number comparing unit 1001 compares the frame number 1 (component image 1) read from memory 1002 with frame number 1 (component number 2). As the frame number of component image 2 is the same as the frame number of component image 1, 2 is output as reference image identification number r. For frame 10, frame number 10 (component image 1) and frame number 3 (component image 2) are compared, and as frame number 10 (component image 1) is closer to frame 10, 1 is output as reference image identification number r. Thereafter, reference image identification numbers r are output as shown in Table 1 in the similar manner.

TABLE 1

| Component Image No. | Frame No. | Reference Image Identification No. |
|---|---|---|
| 1 | 1 | — |
| 1 | 10 | 1 |
| 1 | 20 | 1 |
| 2 | 1 | 1 |
| 2 | 3 | 2 |
| 2 | 10 | 1 |
| 2 | 13 | 2 |
| 2 | 15 | 2 |

Specific description will be given in the following. For example, assume that component image 1 is a background image, and when this is to be coded independently, reference image identification number r is set to 1. In other words, as the reference image for prediction coding, an image which has been already coded and decoded of the same component image is used. Similarly, component image 2 is a component figure image (component image in which only the figure is cut out) of low image quality, and when this is to be coded independently, reference image identification number r is set to 2. Component image 3 is a figure image of high image quality, and when this is to be coded while predicting based on the image using the decoded pixel of component image 2, then the reference image identification number r is set to 2. These identification numbers are coded in component image coding units 151, 152, . . .

In the example mentioned above, component image 2 is referred to as a figure image of low image quality and component image 3 is a figure image of high image quality. The image quality here means spatial resolution, quantization level number, frame rate and so on of the component image. Though component images 2 and 3 are the same in context, the images have different image qualities such as different frame rate, or different spatial resolution. Therefore, when component image 1 and component image 2 are decoded, a background and a figure image of low image quality are reproduced. Here, the figure image has low resolution with rough edges, or it may have low frame rate with awkward motion. However, it may of sufficient image quality to be used in a process step of editing motion pictures. When component image 3 is to be decoded, component image 3 of high image quality is decoded while referring to the decoded image of component image 2 indicated by the identification signal. Accordingly, spatial resolution of the figure image, for example, is enhanced, whereby the edge portion is made smooth, or the frame rate is increased and the motion of the figure is improved to be smooth.

In the present embodiment, the component image as a whole of the figure image has image quality hierarchy. However, only a part of the component image may have the image quality hierarchy. For example, it is possible to provide such hierarchical property that improves image quality of only the head portion of a figure image.

The multiplexing unit 155 will be described in the following. Multiplexing unit 155 performs a process for correcting a plurality of coded data formed separately by the first component image coding unit 151, the second component image coding unit 152, the third component image coding unit 153, . . . into one coded data. The coded data collected together to one at multiplexing unit 155 is fed to decoding apparatus 24, and by demultiplexing unit 156 of FIG. 15, divided into separated coded data (the first component image coded data, the second component image coded data, the third component image coded data, . . . ). In the second component image decoding unit 158, for example, decoding process is performed utilizing the decoded image data of the first component image decoding unit 157. Similarly, in the third component image decoding unit 159, decoding process is performed utilizing the decoded image data of the second component image decoding unit 158.

For simplicity, in FIG. 15, description is given as the coded image data are referenced to by adjacent component image decoding units. Actually, as in the component image coding unit, data of distant component image decoding units may be referred to. The plurality of component images decoded here are synthesized by a synthesizing unit, not shown, in accordance with the image quality in accordance with user's request, and displayed as one reproduced image. Therefore, by changing the component image to be combined, the user may change the image quality of the reproduced image to be displayed.

Figure 16:
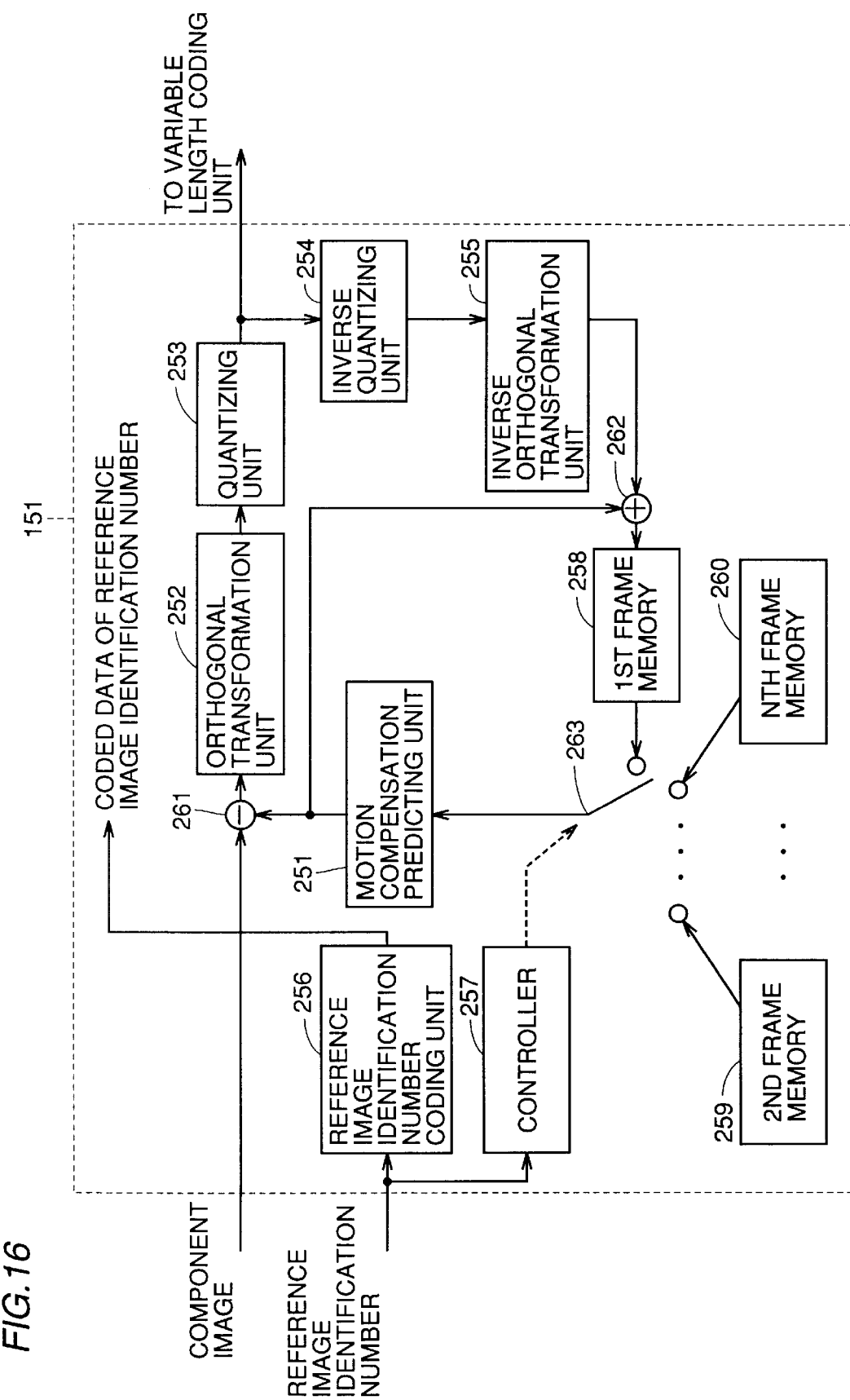
FIGS. 16 to 18 are illustrations showing the structure of a component image coding unit in accordance with the fourth embodiment.

FIG. 16 is a block diagram showing components of the first component image coding unit 151, for example, among the first to third component image coding units 151 to 153. Component image coding unit 151 performs coding using motion compensation prediction and orthogonal transformation which are most generally used as the method of coding. The feature of the fourth embodiment of the present invention resides in that decoded images of a plurality of different component images are stored in a plurality of frame memories and reference image for motion compensation prediction is switched in accordance with the identification number.

The operation of component image coding unit 151 will be described in detail with reference to FIG. 16. An input component image is differentiated from a prediction image, which is an output of a motion compensation predicting unit 251, and is input to an orthogonal transformation unit 252. For orthogonal transformation, discrete cosine transformation (DCT), discrete Fourier transformation or the like is used. A transformation coefficient, which is an output from orthogonal transformation unit 252, is input to a quantizing unit 253, quantized and fed to a variable length coding unit, and input to an inverse quantizing unit 254.

The transformation coefficient subjected to inverse quantization at inverse quantizing unit 254 is transformed to difference data at an inverse orthogonal transformation unit 255. By obtaining sum of the difference data and the prediction data, decoded image is obtained. The decoded image is stored in a first frame memory 258 and used for the next prediction.

The second frame memory 259 to the Nth frame memory 260 store decoded images of other component images. Here, N is a natural number not smaller than 2. A reference image identification number coding unit 256 codes the identification number r generated by the reference image identification number generating unit 154. The coded data is incorporated, at a data synthesizing portion not shown, to the coded data together with the data subjected to variable length coding.

Here, as to the method of coding the reference image identification number r, r may be coded constantly using fixed length coding, variable length coding or the like.

As another method of coding the reference image identification number r, a method is possible in which only a 1 bit signal s indicating whether the component image is to be coded independently or not is coded when the identification number r represents the number of the component image which is being coded at present, and otherwise both the 1 bit signal s and the identification number r are coded.

For example, if the component image 1 is a background image and it is to be coded independently, the signal s is coded to 0, and the identification number r is not coded. Similarly, when the component image 2 is a figure image of low image quality and it is to be coded independently, the signal s is coded to 0, and identification number r is not coded. Next, if the component image 3 is a figure image of high image quality and it is to be coded while predicting based on the decoded image of component image 2, the signal s is coded to 1, and the identification number r is coded to 2.

Figure 17:
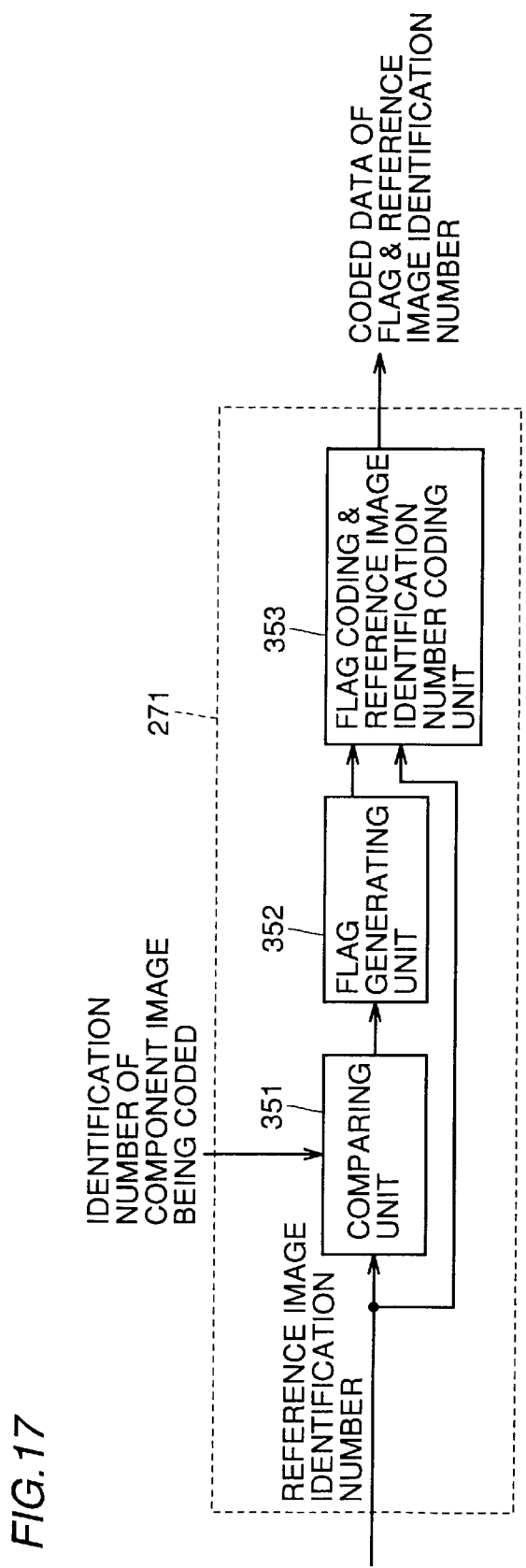

FIG. 17 is a block diagram showing a structure of a component image coding flag generator 271 for generating a flag indicating whether the aforementioned component image is to be coded independently, for coding. It is to replace identification number coding unit 256 of the reference image shown in FIG. 15. Referring to FIG. 17, component image coding flag generator 271 includes a comparing unit 351 receiving the reference image identification number and an identification number of a component image which is being coded, a flag generator 352 connected to comparing unit 351, and a flag coding and reference image identification number coding unit 353 receiving as input the reference image identification number and the output from flag generating unit 352. Comparing unit 351 compares the identification number of the component image which is being coded and the identification number of the reference image. Flag generator 352 outputs an off flag when the identification number of the component image which is being coded is the same as the identification number of the reference image, and outputs an on flag when the identification numbers are different, based on the result of comparison by the comparing unit 351. Flag coding and reference image identification number coding unit 353 codes the flag output from flag generator 352 and the reference image identification number. In flag coding and reference image identification number coding unit 353, if the flag is off, only the flag is coded, and if the flag is on, both the flag and the reference image identification number are coded. Coding of the reference image identification number is performed in the similar manner as in the reference image identification number coding unit 256 described with reference to FIG. 16.

As another method of coding the reference image identification number r, when identification number r does not change from the previous frame, a 1 bit signal t is coded to 0, and otherwise, the 1 bit signal t is coded to 1 and the identification number r is coded. Here, the signal t indicates whether the identification number r has changed from the previous frame. When the first frame of each component image is to be coded, the number of the component image is set to be the reference identification number of the previous frame. In this manner, if the identification number r does not change in a sequence of component images, what should be coded is always the 1 bit signal t, and therefore efficient coding is possible.

Figure 18:
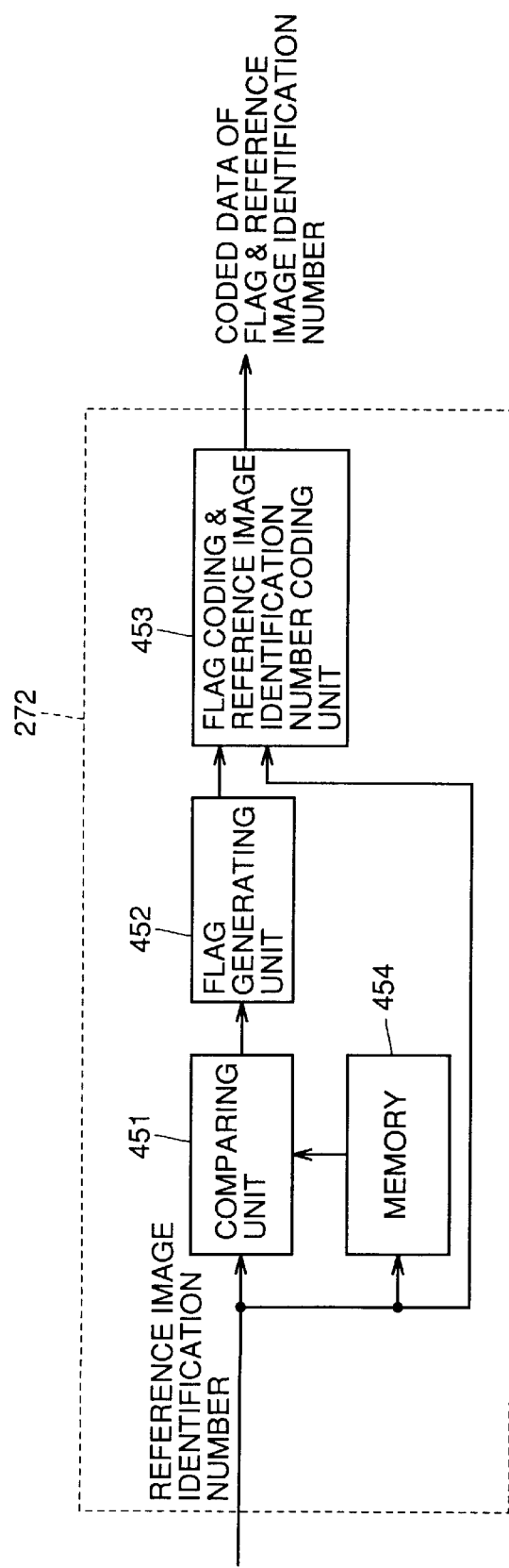

FIG. 18 is a block diagram showing a structure of a reference image identification number transformation flag generator 272, for generating and coding a flag indicating whether there is the aforementioned change in the reference image identification number. This is also to replace the reference image identification number coding unit 256 shown in FIG. 16. Referring to FIG. 18, flag generator 272 indicating presence/absence of change of the reference image identification number includes a comparing unit 451 and a memory 454 to which the reference image identification number is input, a flag generating unit 452 connected to comparing unit 451, and a flag coding and reference image identification number coding unit 453 to which the output of flag generating unit 452 and the reference image identification number are input.

Memory 454 stores the reference image identification number. Comparing unit 451 compares the reference image identification number of the present frame with the identification number of the reference image of the previous frame. Flag generating unit 452 outputs an off flag if the identification numbers of the present frame and the previous frame are the same and outputs an on flag when the identification numbers are different, based on the result from the comparing unit 451. Flag coding and reference image identification number coding unit 453 codes the flag obtained by flag generating unit 452 and the reference image identification number.

In flag coding and reference image identification number coding unit 453, if the flag is off, the flag only is coded, and if the flag is on, both the flag and the reference image identification number are coded. As to the coding of reference image identification number, it is performed in the similar manner as in the reference image identification number coding unit 256 described above with reference to FIG. 16.

In FIG. 16, controller 257 controls a switch 263 for selecting a frame memory based on the reference image identification number r. Motion compensation predicting unit 251 forms a prediction image from the reference image. For example, by block matching, motion vector for each block is detected, and by the detected motion vector, motion compensation is performed.

When the component image is to be subjected to intra-frame coding, difference between the input image and the predicted image is not obtained by a subtractor 261, and the sum of the output of inverse orthogonal transformation unit 255 and the predicted image is not obtained in an adder 262 either. Though not explicitly shown in FIG. 16, data representing shape, position and so on of the component are coded separately.

Figure 24:
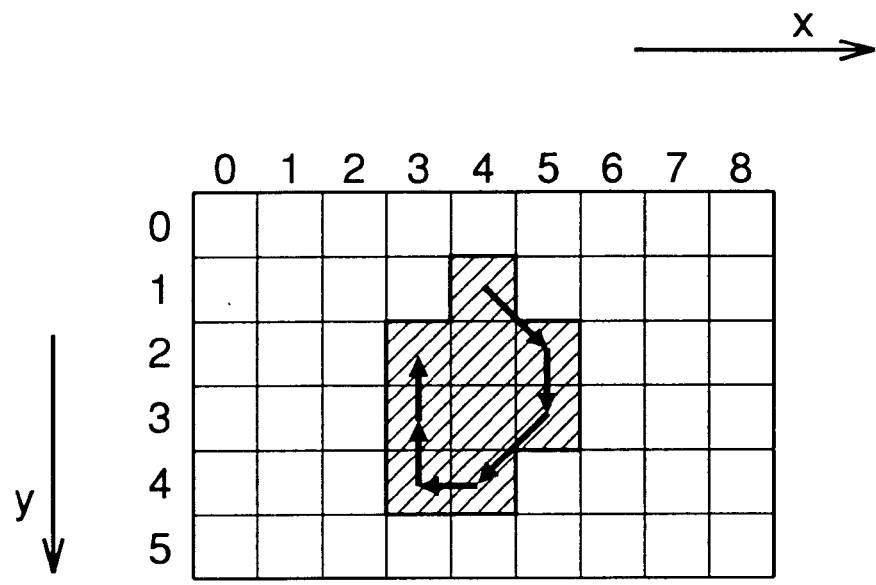
FIG. 24 shows an example of an arbitrary shape area of pixels and area shape data (8 directional quantizing code).
Figure 25:
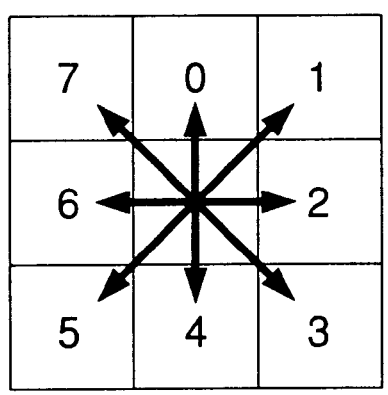
FIG. 25 is an illustration depicting the 8 directional quantizing code.

The shape or position of the component is coded by representing contour pixels of the shape by means of a chain code, for example. FIG. 24 shows an example. Here, the hatched portion represents a component area, and the arrow represents a delay code indicating a contour pixel of the shape. The position of the component is represented by positional coordinate of a pixel (here, the pixel at the coordinate (4, 1)) which is the start point of the chain code. The chain code is coded by allocating values 0 to 7 to the arrows in 8 directions shown in FIG. 24.

Figure 19:
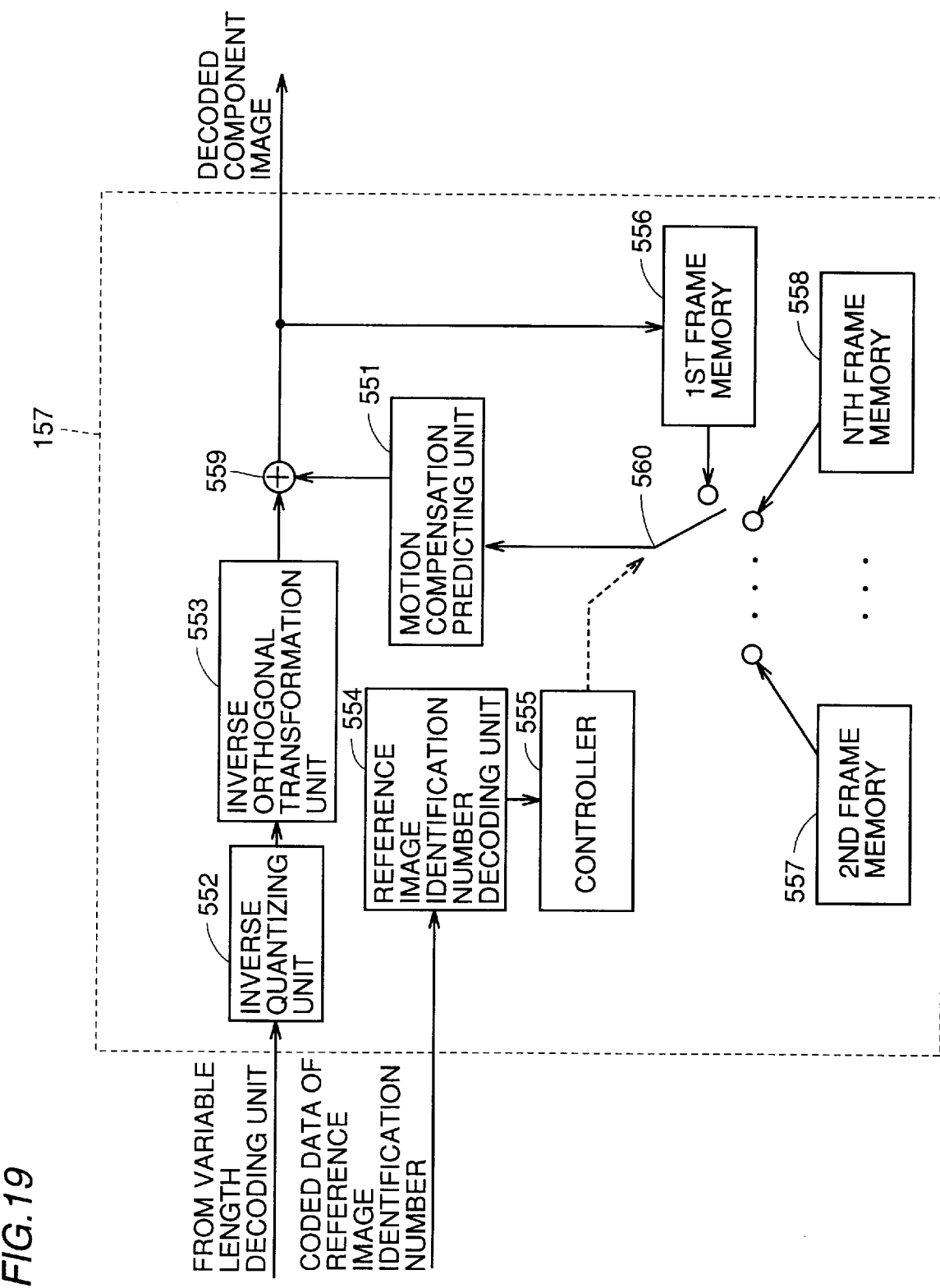
FIGS. 19 to 21 are block diagrams showing the structure of the component image decoding unit in accordance with the fourth embodiment.

FIG. 19 is a block diagram showing an example of component image decoding units 157, 158, . . . . Motion compensation predicting unit 551, inverse quantization unit 552, inverse orthogonal transformation unit 553, controller 555, a first frame memory 556, second frame memory 557 to Nth frame memory 558, adder 559 and switch 560 operate in the similar manner as those shown in FIG. 16.

The coded data is separated to variable length coded data of the orthogonal transformation coefficient, the coded data of the reference image identification number and so on at a data separating unit, not shown. The orthogonal transformation coefficient data decoded at a variable length decoding unit is subjected to inverse quantization at inverse quantization unit 552. The transformation coefficient which has been subjected to inverse quantization is subjected to inverse orthogonal transformation at inverse orthogonal transformation unit 553.

The data which has been subjected to inverse orthogonal transformation is added to the predicted image output from motion compensation predicting unit 551 at an adder unit 559, and decoded image is formed. The decoded image is stored in the first frame memory 556 to be used for next prediction and, output to be synthesized with other decoded component images and displayed on a display, for example.

Reference image identification number decoding unit 554 decodes the reference image identification number r and inputs the identification number r to controller 555. Controller 555 controls switch 560 for selecting a frame memory based on the identification number r. Decoded images of other component images are stored in the second frame memory 557 to Nth frame memory 558.

Function of the reference image identification number decoding unit 554 will be described. In the decoding apparatus, if the identification number r is always coded, the identification number r is decoded by variable length decoding, for example. If the identification number r is coded in the coding apparatus together with the 1 bit signal s indicating whether the component image is to be coded independently or not, then at first, the signal s is decoded. If the signal s is 0 it is assumed that the component image is coded independently, regardless of other component images. If the signal s is 1, the identification number r is set to be the number of the component image which is being decoded at present. Otherwise, the identification number r which is coded following the signal s, is decoded.

Figure 20:
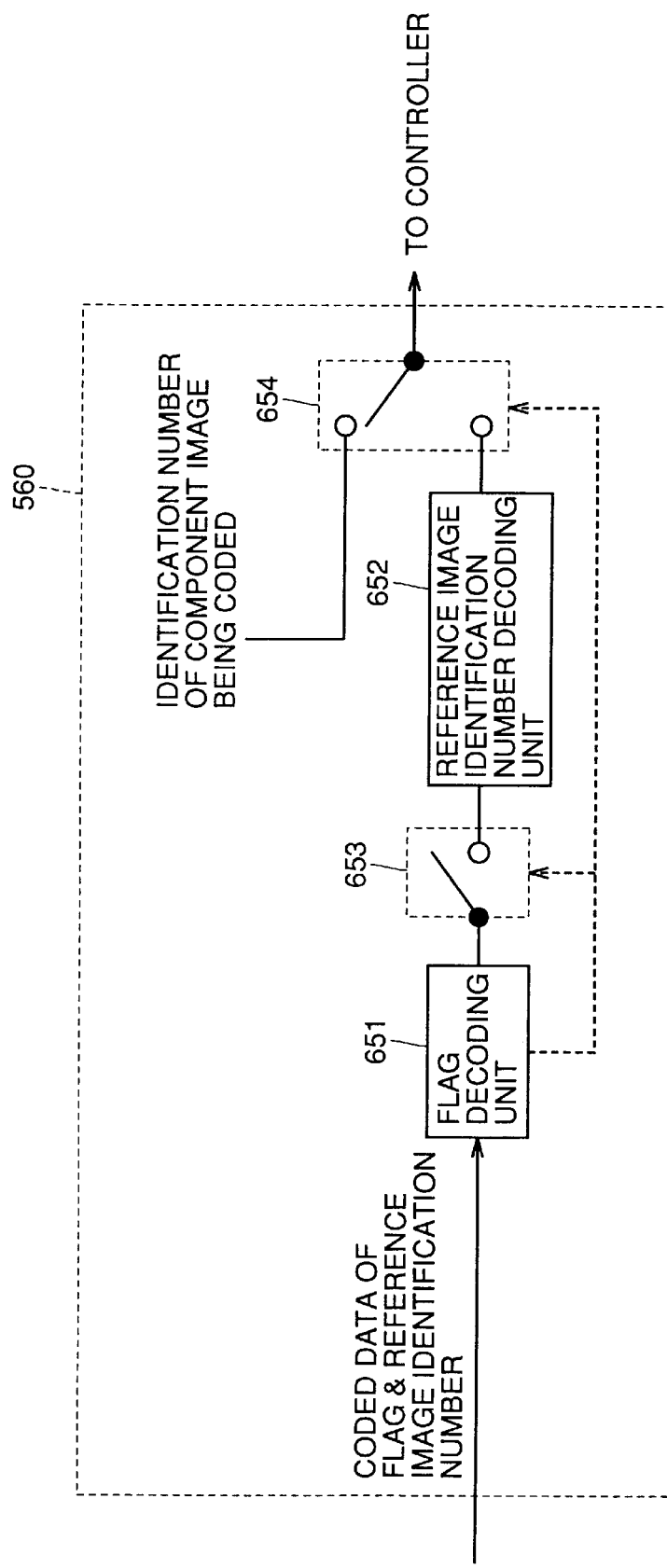

FIG. 20 is a block diagram showing a decoding processing unit 560 for performing decoding process when the flag as well as the identification number are coded in the coding apparatus described above, and it is to replace the reference image identification number decoding unit 554 shown in FIG. 19. Referring to FIG. 20, decoding processing unit 560 includes a flag decoding unit 651 receiving as input the coded data of the flag and the reference image identification number, a reference image identification number decoding unit 652 connected to flag decoding unit 651 through a switch 653, and a switch 654 for feeding to a controller either a signal indicating the identification number of the component image which is being coded or the signal from the reference image identification number decoding unit 652.

When the decoded flag is on, switch 653 is turned on and switch 654 is turned to the side of reference image identification number decoding unit 652 to perform decoding process of the identification number, and a new reference image identification number is set to the identification number decoded by the reference image identification number decoding unit 652. If the decoded flag is off, switch 653 is turned off, and the switch 654 is switched to the side opposite to the reference image identification number decoding unit 652, and a new reference image identification number is set to the identification number of the component image which is being coded.

If the identification number r has been coded together with the 1 bit signal t indicating change from the previous frame in the coding apparatus, first the signal t is decoded. If the signal t is 0, it indicates that the identification number r is not changed from the previous frame, and therefore the identification signal of the previous frame is used as it is. If the signal t is 1, the coded identification number r is decoded continuously. Here, it is assumed that the initial value of the reference image identification number is the number of the component image which is being decoded.

Figure 21:
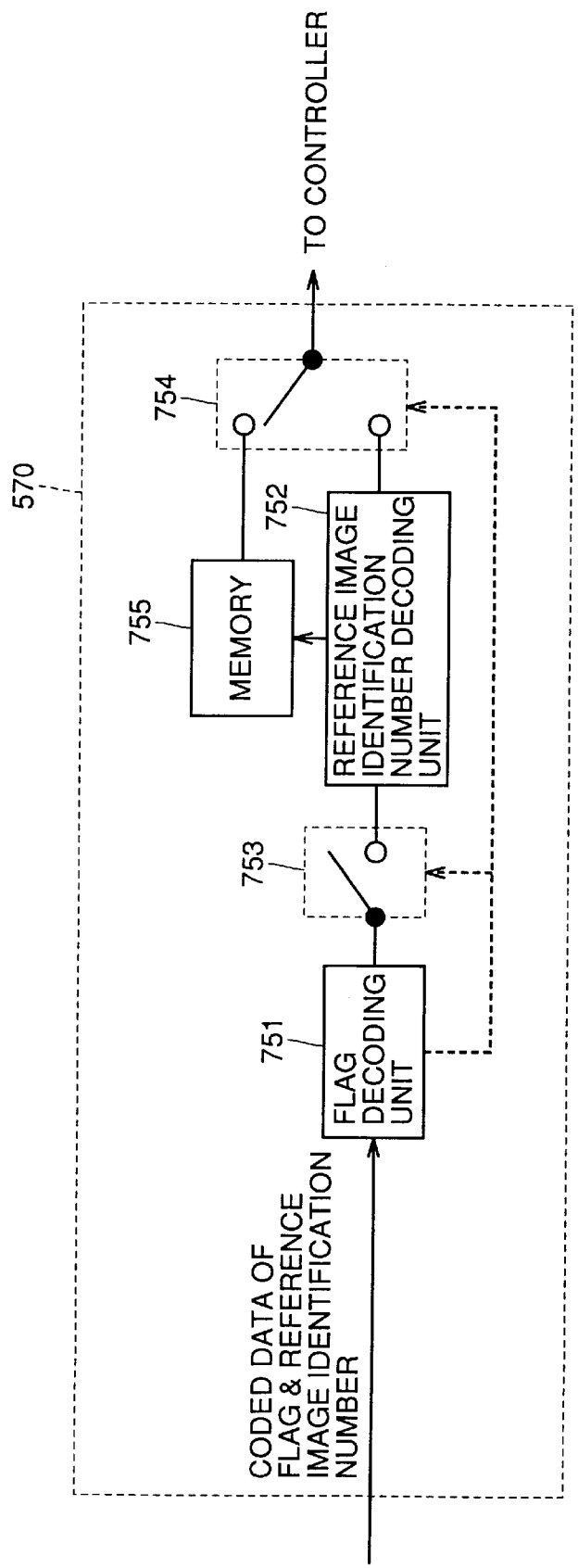

FIG. 21 is a block diagram showing another decoding processing unit 570 for performing decoding process when the flag as well as the identification number are coded by the coding apparatus described above, and it is to replace the reference image identification number decoding unit 554 shown in FIG. 19. Referring to FIG. 21, the decoding processing unit 570 includes a flag decoding unit 751 receiving as inputs the coded data of the flag and the reference image identification number, a reference image identification number decoding unit 752 connected to flag decoding unit 751 through a switch 753, a memory 755 connected to reference image identification number decoding unit 752, and a switch 754 for feeding to a controller a signal from the reference image identification number decoding unit 752 or from memory 755.

When the decoded flag is on, switch 753 is turned on, and switch 754 is switched to the side of the reference image identification number decoding unit 752 to perform decoding process of the identification number, and a new reference image identification number is set to the identification number decoded by the reference image identification number decoding unit 752. If the decoded flag is off, switch 753 is turned off, and switch 754 is switched to the side of memory 755, and a new reference image identification number is read from memory 755 and set to the reference image identification number of the previous frame.

In the fourth embodiment of the present invention described above, three different methods have been described as methods of coding the reference image identification number. Various other methods may be possible. For example, a signal s indicating whether the component motion picture is coded independently or not may be coded and decoded. In that case, if the component motion picture is not coded independently, the component image having the number smaller by one than the component image number which is being coded or decoded should always be used as the reference image.

As for the coding of reference image identification number, coding of the same component image may be performed frame by frame, or coding may be performed only in the first frame. The former is preferred when the component number used as the reference image is to be changed frame by frame.

Industrial Applicability

As described above, according to the motion picture coding and decoding apparatus in accordance with the present invention, even when area shape changes with time, there is not a distortion in the image obtained by superimposing lower and upper layers, and good image is obtained. Therefore, it is suitable for coding and decoding motion pictures.

What is claimed is:

1. A motion picture decoding apparatus receiving as inputs lower layer coded data obtained by coding a motion picture sequence with a first frame rate, and upper layer coded data obtained by coding a specific area of said motion picture sequence with a second frame rate higher than said first frame rate, for decoding the lower layer with said first frame rate, or decoding the lower layer with said first frame rate and the upper layer with said second frame rate and superimposing the lower and upper layers, said apparatus comprising:

a decoding unit for decoding, in the absence of a lower layer frame corresponding to a frame position the same as the upper layer frame, a first area shape and a second area shape indicative of area shapes in first and second lower layer frames preceding and succeeding the frame position, from said upper layer coded data; and a synthesizing unit for synthesizing said absent lower layer frame by using said first area shape, said second area shape and said first and second lower layer frames.

2. The motion picture decoding apparatus according to claim 1, wherein said decoding of said first and second area shapes is not performed in the absence of the lower layer frame corresponding to the same frame position as the upper layer at the time of decoding, and said first and second area shapes are extracted from decoded data of one or both of the lower and upper layers.

3. The motion picture coding and decoding apparatus according to claim 1 or 2, comprising a first flag setter for setting a first flag indicating whether pixel information of the upper layer is to be coded or not at the time of coding said upper layer, and whether only the area shape is coded in the upper layer or whether said area shape and the pixel information are both coded is determined by the decoding apparatus based on said first flag.

4. The motion picture decoding apparatus according to claim 2, further comprising an area shape extracting unit for extracting, when area shapes of the lower layers preceding and succeeding in time are to be extracted in the absence of the lower layer frame corresponding to the same frame position as the upper layer, said area shapes being formed by dividing decoded image of the lower layer and utilizing the result of division.

5. A motion picture decoding apparatus receiving as inputs, lower layer decoded data obtained by coding a motion picture sequence with a first frame rate, upper layer coded data obtained by coding a specific area of said motion picture sequence with a second frame rate higher than said first frame rate, and a flag indicative of a method of synthesizing a lower layer frame, decoding the lower layer with said first frame rate, or for decoding the lower layer with said first frame rate and the upper layer with said second frame rate and superposing the upper and lower layers, comprising:

a flag decoding unit for decoding said flag;

a decoding unit for decoding, in the absence of a lower layer frame corresponding to a frame position the same as the upper layer frame, a first area shape and a second area shape indicative of area shapes of first and second lower layer frames preceding and succeeding the frame position, from said upper layer coded data; and a synthesizing unit for determining whether synthesization of said absent lower layer frame is to be performed or not using said first area shape, said second area shape and said first and second lower layer frames, based on the flag decoded by said flag decoding unit, and for synthesizing the lower layer frame.

6. A motion picture decoding apparatus, receiving as inputs lower layer coded data obtained by coding a motion picture sequence with a first frame rate, upper layer coded data obtained by coding a specific area of said motion picture sequence with a second frame rate higher than said first frame rate, and, for each frame of the upper layer, first and second flags indicative of whether a first area shape which is an area shape of a first lower layer preceding said frame in time and a second area shape which is an area shape of a second lower layer succeeding said frame in time are to be decoded, respectively, for decoding the lower layer with said first frame rate, or for decoding the lower layer with said first frame rate and the upper layer with said second frame rate and superposing the upper and lower layers, comprising:

a flag decoding unit for decoding said first and second flags;

a decoding unit for decoding in the absence of a lower layer frame corresponding to a frame position the same as the upper frame, the first area shape and the second area shape indicative of area shapes of the first and second lower layer frames preceding and succeeding the frame position, from said upper layer coded data; and a synthesizing unit for determining whether the first area shape and the second area shape are to be decoded based on the first and second flags decoded by said flat decoding unit, and when neither the first nor the second area shape is to be decoded, determining the area shapes used for synthesization last time to be the area shapes to be used for synthesization this time, and when only the second area shapes is to be decoded, determining the second area shape used for synthesization last time to be the first area shape to be used for synthesization this time, and for synthesizing said absent lower layer frame, using said first area shape, said second area shape and said first and second lower layer frames.

7. A motion picture coding apparatus for prediction coding a motion picture, wherein said motion picture includes a plurality of component motion images constituting said motion picture, said coding apparatus comprising:

a reference image identification information coding unit for coding identification information of a reference component image used for prediction coding;

a reference image selecting unit for selecting a reference image from said plurality of component images in accordance with said identification information, wherein prediction coding is performed in accordance with said selected reference image.

8. A motion picture coding apparatus for prediction coding a motion picture, wherein said motion picture includes a plurality of component motion images constituting said motion picture, said coding apparatus comprising:

a flag coding unit for coding a flag indicating whether a reference component image used for said prediction coding belongs to a component motion image which is being coded;

reference image identification information coding unit for coding identification information for identifying a reference component image used for said prediction coding, only when said flag indicates the reference component images does not belong to the component motion image which is being coded; and a reference image selecting unit for selecting a reference image from said plurality of component motion images in accordance with said flag or said identification information, wherein prediction coding is performed in accordance with said selected reference image.

9. The motion picture coding apparatus according to claim 7, wherein said reference image identification information coding unit sets a flag off when said identification information does not change from a previous frame, sets the flag on when said identification information has changed from the previous frame, codes said flag only when said flag is off and codes said flag and said identification number when said flag is on.

10. The motion picture coding apparatus according to claim 7, comprising
   a comparing unit for comparing an identification number of said reference image and an identification number of said component image which is being coded;
   a flag generating unit for generating a flag which is turned off when the identification number of said reference image is the same as the identification number of said component image and turned on when the numbers are different; and
   a flag coding and reference image identification number coding unit for coding only the flag when the flag is off, and coding said flag and the identification number of said reference image when said flag is on.

11. A motion picture coding apparatus, comprising:
   a memory storing a reference image identification number of a previous frame;
   a comparing unit for comparing a reference image identification number of a present frame with the reference image identification number of the previous frame read from said memory;
   a flag generating unit for generating an off flag when the reference image identification numbers of said previous frame and the present frame are the same and generating an on flag if the identification numbers are different; and
   a flag coding and reference image identification number coding unit for coding only the flag when said flag is off and coding said flag and the reference image identification number of the present frame when said flag is on.

12. The motion picture coding apparatus according to claim 11, wherein said flag is a 1 bit signal.

13. A motion picture decoding apparatus for decoding motion picture data including a plurality of component motion images and coded data including identification information for identifying a reference component image for prediction coding encoded therein, comprising:
   a reference image identification information decoding unit for decoding identification information for identifying a reference component image used for prediction coding; and
   a reference image selecting unit for selecting a reference image from said plurality of component images in accordance with said identification information, wherein prediction decoding is performed in accordance with said selected reference image.

14. A motion picture decoding apparatus for decoding motion image data including a plurality of component motion images and coded data including a flag and identification information for identifying a reference component image for prediction coding encoded therein, comprising:
   a flag decoding unit for decoding a flag indicating whether a reference component image used for prediction coding belongs to a component motion image which is being coded;
   a reference image identification information decoding unit for decoding identification information for identifying a reference component image used for said prediction coding, only when said flag indicates the reference component image does not belong to the component image which is being coded; and
   a reference image selecting unit for selecting a reference image from said plurality of component motion images, in accordance with said decoded flag or said decoded identification information, wherein prediction decoding is performed in accordance with said selected reference image.

15. The motion picture decoding apparatus according to claim 13, wherein said reference image identification information coding unit decodes a flag among the coded data of said identification information, regards reference image identification information used in a previous frame as reference image identification information when said flag is off, and decodes coded data of said identification information when said flag is on.

16. The motion picture decoding apparatus according to claim 13, comprising a flag decoding unit for decoding a flag among coded data, and
   a reference image identification number decoding unit for decoding a reference image identification number among the coded data, wherein
   an identification number of a component image which is being coded is regarded as an identification number of a reference image when said decoded flag is off, and a result of decoding by said reference image identification number decoding unit is regarded as the reference image identification number when said flag is on.

17. The motion picture decoding apparatus according to claim 13, comprising
   a flag decoding unit for decoding a flag among coded data,
   a memory storing a reference image identification number of a previous frame, and
   a reference image identification number decoding unit for decoding a reference image identification number among said coded data, wherein
   a reference image identification number read from said memory is regarded as the identification number of a reference image of a present frame when said decoded flag is off, and a result of decoding by said reference image identification number decoding unit is regarded as the reference image identification number of the present frame when said flag is on.

* * * * *